US008009234B2

(12) United States Patent
Lee et al.

(10) Patent No.: US 8,009,234 B2
(45) Date of Patent: Aug. 30, 2011

(54) AUDIO/VIDEO DEVICES FOR VISUALIZING OPERATIONAL STATES THEREIN OR THEREAMONG INTO CONTENT FLOW AND METHOD OF CONTROLLING OPERATIONS THEREOF

(75) Inventors: Dong-seok Lee, Seoul (KR); Se-hyun Park, Seoul (KR); Sun-young Gu, Seoul (KR); Na-young Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1228 days.

(21) Appl. No.: 11/248,243

(22) Filed: Oct. 13, 2005

(65) Prior Publication Data

US 2006/0085568 A1 Apr. 20, 2006

(30) Foreign Application Priority Data

Oct. 20, 2004 (KR) ........................ 10-2004-0083868

(51) Int. Cl.
*H04N 5/50* (2006.01)
*H04N 5/268* (2006.01)
*G06F 3/00* (2006.01)
(52) U.S. Cl. ............. 348/706; 348/569; 710/10; 710/18
(58) Field of Classification Search .................. 348/722, 348/705, 706, 564, 569; 715/764, 781, 788, 715/810, 835; 710/10, 11, 15, 18, 19; 700/17, 700/18; 725/80
See application file for complete search history.

(56) References Cited

U.S. PATENT DOCUMENTS

| 5,574,965 | A | * | 11/1996 | Welmer ......................... 725/151 |
| 5,793,366 | A | * | 8/1998 | Mano et al. ................... 715/839 |
| 5,883,621 | A | | 3/1999 | Iwamura |
| 6,128,016 | A | * | 10/2000 | Coelho et al. ................ 715/808 |
| 6,421,069 | B1 | * | 7/2002 | Ludtke et al. ................ 715/762 |
| 6,591,313 | B1 | * | 7/2003 | Hata et al. ........................ 710/33 |
| 6,738,101 | B1 | | 5/2004 | Utsunomiya et al. |
| 6,745,252 | B1 | * | 6/2004 | Yanagawa et al. ................ 710/8 |
| 6,806,977 | B1 | * | 10/2004 | Freeny et al. ................ 358/1.15 |
| 6,825,858 | B2 | * | 11/2004 | Sato ............................. 715/735 |
| 6,829,779 | B1 | * | 12/2004 | Perlman ......................... 725/37 |

(Continued)

FOREIGN PATENT DOCUMENTS

EP 0535749 A2 4/1993

(Continued)

OTHER PUBLICATIONS

Extended European Search Report, mailed Jan. 24, 2007, and issued in corresponding European Patent Application No. 06122120.6-2202.

(Continued)

*Primary Examiner* — Victor Kostak
(74) *Attorney, Agent, or Firm* — Staas & Halsey LLP

(57) ABSTRACT

An audio/video (A/V) device and a method of controlling the operation thereof, which visualize operation states in or among A/V devices into a flow of content. The A/V device includes an on screen display (OSD) processing unit to OSD process information, and a control unit to control the OSD processing unit so that the OSD processing unit OSD processes a plurality of modules constituting the A/V device and functions thereof. Accordingly, it is possible for a user to easily recognize operations in and among the A/V devices, which provides convenient operation to the user.

126 Claims, 17 Drawing Sheets

U.S. PATENT DOCUMENTS

| | | | |
|---|---|---|---|
| 6,957,396 B2 * | 10/2005 | Iwamura | 715/771 |
| 6,976,267 B1 * | 12/2005 | Takano et al. | 725/80 |
| 7,301,664 B2 * | 11/2007 | Freeny et al. | 358/1.15 |
| 7,448,060 B2 * | 11/2008 | Takano et al. | 725/80 |
| 2002/0093885 A1 * | 7/2002 | Numano et al. | 369/30.08 |
| 2003/0227568 A1 | 12/2003 | Stahl et al. | |

FOREIGN PATENT DOCUMENTS

| | | |
|---|---|---|
| EP | 1 377 050 A | 1/2004 |
| JP | 10-224875 | 8/1998 |
| KR | 2000-0074940 | 12/2000 |
| KR | 20-0233883 | 5/2001 |
| KR | 2001-0039340 | 5/2001 |
| KR | 2001-0054612 | 7/2001 |
| KR | 2002-0041948 | 6/2002 |
| KR | 2003-0022605 | 3/2003 |
| WO | WO 97/49057 | 12/1997 |

OTHER PUBLICATIONS

European Examination Report for corresponding European Patent Application No. 05256286.5 dated Jul. 18, 2007 (in English).

Official Action (issued Mar. 20, 2006) issued from Korean Intellectual Property Office with respect to Korean Patent Application No. 2004-83868 filed on Oct. 20, 2004.

European Examiner Report for corresponding European Patent Application No. 06122120.6 filed Oct. 11, 2006 (4 pgs) (in English).

* cited by examiner

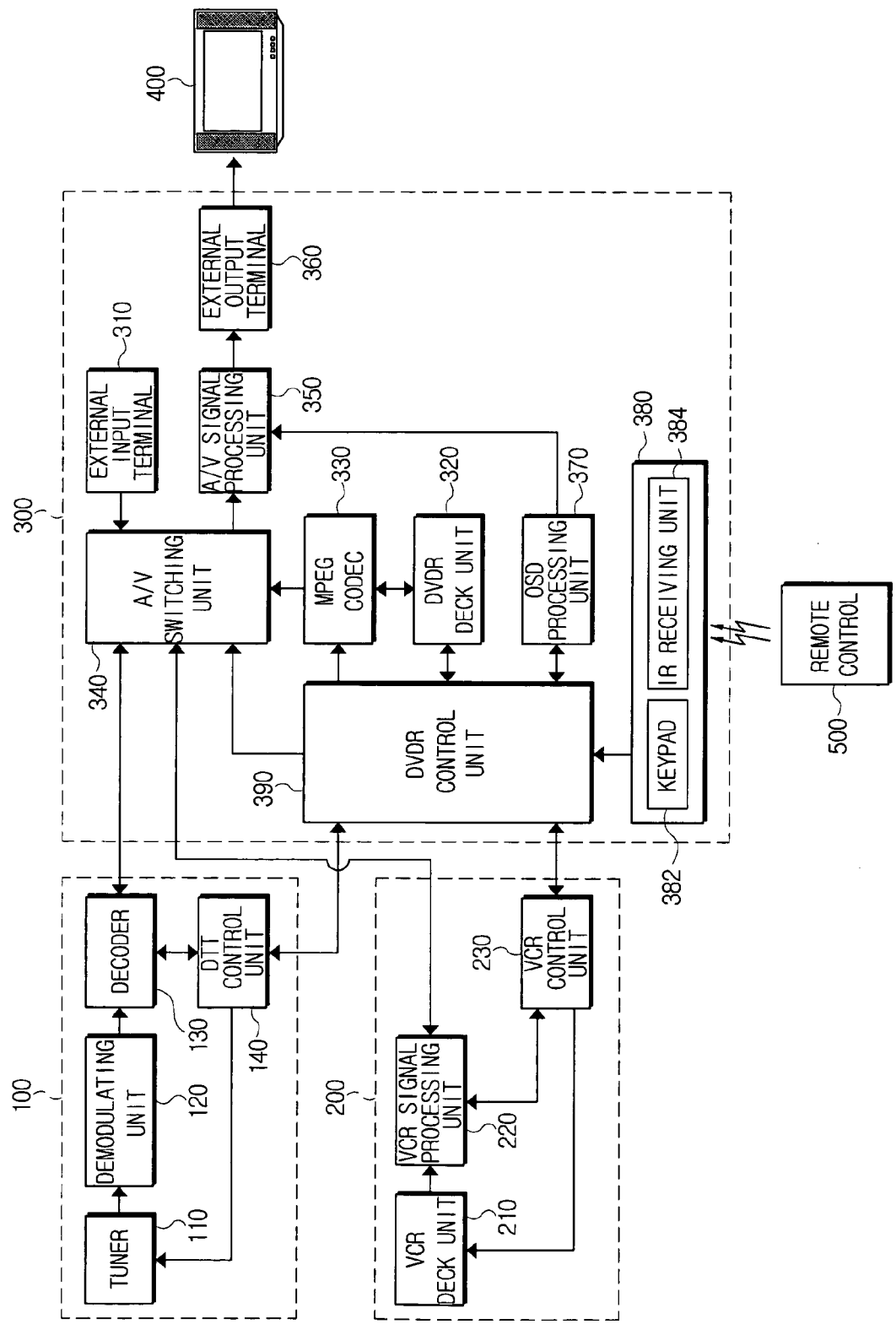

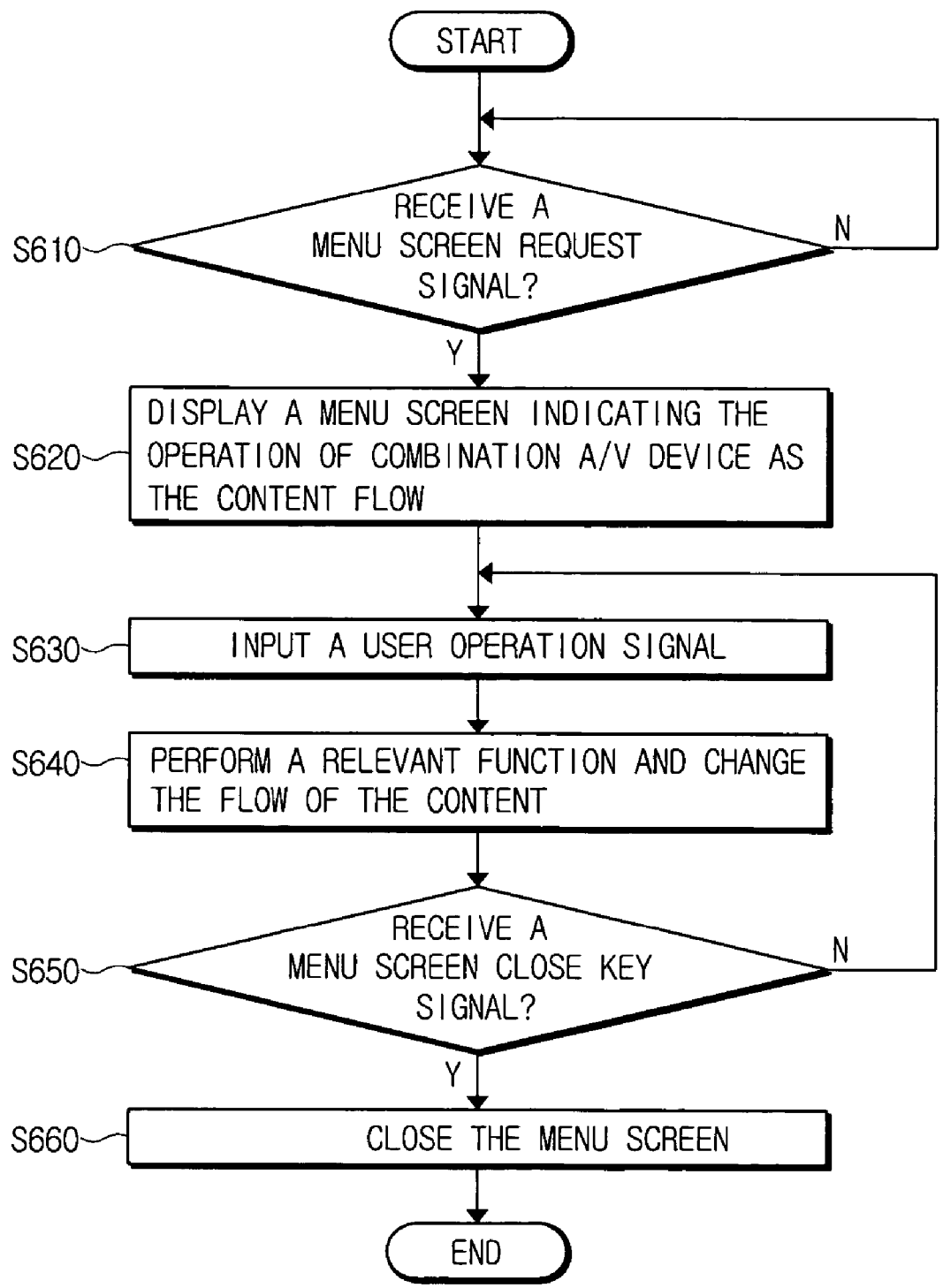

AUDIO/VIDEO DEVICES FOR VISUALIZING OPERATIONAL STATES THEREIN OR THEREAMONG INTO CONTENT FLOW AND METHOD OF CONTROLLING OPERATIONS THEREOF

CROSS-REFERENCE TO RELATED APPLICATION

This application claims the benefit of Korean Patent Application No. 2004-83868, filed on Oct.20, 2004, the disclosure of which is incorporated herein by reference.

BACKGROUND OF THE INVENTION

1. Field of the Invention

The present invention relates generally to audio/video (A/V) devices. More particularly, embodiments of the present invention relate to A/V devices and a method of controlling the operation thereof, which provide a user interface in which operations in or among A/V devices are visualized so that a user easily recognizes the operations.

2. Description of the Related Art

With the recent development of digital technologies, a network environment has been provided in which A/V devices each performing independent functions, such as a digital TV (DTV), a video cassette recorder (VCR), a digital versatile disk player (DVDP), a DVD recorder (DVDR), and/or a set-top box (STB), are connected to a network for transmitting and receiving contents thereamong.

Further, a number of combination systems have been developed in which the A/V devices that perform independent functions as described above are incorporated into a single system. In the combination systems, since parts performing common functions are incorporated into a single unit, operational convenience is achieved and the amount of physical space required is reduced as compared to discrete devices.

The conventional A/V device is considered as a black box in that the internal operation thereof is not revealed to users, as shown in FIG. 1. Interacting with a conventional A/V device does not pose a problem if the A/V devicee only handles and/or reproduces content between one source and one destination. The term "content" is used in its broadest sense to include, not by way of limitation, audio signals, video signals, and the like.

Interaction with a conventional A/V device becomes problematic as the number of sources and destinations of content handled by the A/V device, and the number of tasks performed on the respective contents increase, as they have recently. This is because such a conventional scheme displays only processing results according to a user's operation making it difficult for a user to understand the operation of the A/V device.

Furthermore, it is difficult for the user to recognize how a particular content item is being processed in the A/V device, whether current scenes on the display device are provided from a particular content source, and what operation is required for a desired task. Thus, operation becomes inconvenient for a user.

SUMMARY OF THE INVENTION

Accordingly, it is an aspect of the present invention to provide an audio/video (A/V) device and a method of controlling the operation thereof, which provide a user interface in which operations in or among the A/V devices are indicated by a flow of content so that a user easily recognizes the operations.

The above aspect of the present invention is substantially realized by providing an audio/video (A/V) device, including an on screen display (OSD) processing unit to OSD process information, and a control unit to control the OSD processing unit so that the OSD processing unit OSD processes a plurality of modules constituting the A/V device and functions thereof.

The control unit may control the OSD processing unit so that the OSD processing unit OSD processes operational states of respective modules and an operational state of the A/V device.

The OSD processing unit may indicate the plurality of modules icons.

The control unit may control the OSD processing unit so that the OSD processing unit OSD processes a connection diagram indicating a connection relationship among respective icons.

The plurality of modules may include a module corresponding to at least one content source that provides content, and a module corresponding to at least one content destination that receives the content from the content source.

Here, the module corresponding to the content source may include at least one of an external input module, a digital versatile disk (DVD) reproducing module, a video cassette recorder (VCR) reproducing module, and a hard disc drive (HDD) reproducing module, and the module corresponding to the content destination may include at least one of a DVD recording module, a VCR recording module, a HDD storage module, and an external output module.

In accordance with another aspect of the present invention, there is provided a method of controlling an operation of an audio/video (A/V) device, including receiving an OSD screen request signal, and producing and providing an OSD screen indicating a plurality of modules constituting the A/V device and functions thereof.

Operational states of respective modules and the A/V device are displayed on the OSD screen, and the plurality of modules are indicated by icons.

Further, a connection diagram indicating a connection relationship among respective icons may be displayed on the OSD screen.

The plurality of modules may include a module corresponding to at least one content source that provides content, and a module corresponding to at least one content destination that receives the content from the content source.

Here, the module corresponding to the content source may include at least one of an external input module, a DVD reproducing module, a VCR reproducing module, and a HDD reproducing module, and the module corresponding to the content destination may include at least one of a DVD recording module, a VCR recording module, a HDD storage module, and an external output module.

In accordance with another aspect of the present invention, there is provided an audio/video (A/V) device, including an OSD processing unit to OSD process information, and a control unit to control the OSD processing unit so that the OSD processing unit produces an OSD screen indicating a flow of content among a plurality of modules constituting the A/V device.

The flow of the content may be indicated as content transfer from a content source to a content destination.

The flow of the content may be indicated by animation.

Further, the content flow may be changed with change in either or both of the content source and the content destination.

A module corresponding to at least one content source and a module corresponding to at least one content destination that receives the content from the content source may be displayed on the OSD screen.

Icon information obtained by OSD processing functions of respective modules may be further displayed on the OSD screen.

In accordance with another aspect of the present invention, there is provided a method for controlling an operation of an audio/video (A/V) device, including receiving an OSD screen request signal, and producing and providing an OSD screen, a flow of content among a plurality of modules constituting the A/V device being displayed on the OSD screen.

The flow of the content may be indicated as content transfer from a content source to a content destination, and the flow of the content is indicated by animation.

The method may further include changing flow paths of the content with change in either or both of the content source and the content destination.

At least one module corresponding to a content source and at least one module corresponding to a content destination may be displayed on the OSD screen.

Further, icon information indicating, as OSD, the functions provided by the respective modules and a connection diagram indicating a connection relationship among the respective icons may be displayed on the OSD screen.

In accordance with yet another aspect of the present invention, there is provided an audio/video (A/V) device including an OSD processing unit to OSD process information, and a control unit to control the OSD processing unit so that the OSD processing unit OSD processes a connection diagram indicating a connection relationship among a plurality of modules constituting the A/V device.

The control unit may control the OSD processing unit so that the OSD processing unit indicates content-movable paths among the plurality of modules as a first connection line, and control the OSD processing unit so that the OSD processing unit indicates content-moving paths among the plurality of modules as a second connection line other than the first connection line.

The control unit may control the OSD processing unit so that the OSD processing unit OSD processes a connection diagram between one module of the plurality of modules and the others, when a content recording medium is loaded into the one module.

The control unit may control the OSD processing unit so that the OSD processing unit eliminates the connection diagram between the one module and the others when the content recording medium is unloaded from the one module.

Further, the control unit may control the OSD processing unit so that, when a content is input from an external input module that is one module of the plurality of modules, the OSD processing unit OSD processes a connection diagram between the one module and the others.

The control unit may control the OSD processing unit so that, when the content input from the external input module is stopped, the OSD processing unit eliminates the connection diagram among the one module and the others.

In accordance with yet another aspect of the present invention, there is provided a method for controlling an operation of an audio/video (A/V) device, including receiving an OSD screen request signal, and producing and providing an OSD screen, a connection diagram indicating a connection relationship among a plurality of modules constituting the A/V device being displayed on the OSD screen.

A content-movable path among the plurality of modules may be displayed by a first connection line on the OSD screen, and a content-moving path among the plurality of modules may be displayed by a second connection line other than the first connection line on the OSD screen.

The connection diagram between one module of the plurality of modules and the others may be displayed on the OSD screen when a content recording medium is loaded into the one module, and the connection diagram between the one module and the others on the OSD screen may be eliminated when the content recording medium is unloaded from the one module.

Further, when content is input from an external input module that is one module of the plurality of modules, a connection diagram between the one module and the others may be displayed on the OSD screen, and when the content input from the external input module is stopped, the connection diagram among the one module and the others on the OSD screen may be eliminated.

In accordance with yet another aspect of the present invention, there is provided an audio/video (A/V) device, including an OSD processing unit to OSD process information, and a control unit to control the OSD processing unit so that the OSD processing unit OSD processes an operational state of the A/V device composed of a plurality of modules and operational states of the respective modules.

The operational state may comprise at least one of content viewing, content recording, content reproducing, and standby.

In accordance with yet another aspect of the present invention, there is provided a method of controlling an operation of an audio/video (A/V) device, including receiving an OSD screen request signal, and producing and providing an OSD screen, an operational state of the A/V device composed of a plurality of modules and operational states of the respective modules being displayed on the OSD screen.

The operational state may comprise at least one of content viewing, content recording, content reproducing, and standby.

In accordance with yet another aspect of the present invention, there is provided an audio/video (A/V) device, including an OSD processing unit to OSD process information, and a control unit to control the OSD processing unit so that the OSD processing unit OSD processes content flow among a plurality of modules constituting the A/V devices and, when the content flow among the plurality of modules is changed, OSD processes the content flow in response to the change in the content flow.

In accordance with yet another aspect of the present invention, there is provided a method for controlling an operation of an audio/video (A/V) device, including receiving an OSD screen request signal, producing and providing an OSD screen, content flow among a plurality of modules constituting the A/V device being displayed on the OSD screen, and when the content flow among the plurality of modules is changed, changing the OSD screen in response to the change in the content flow.

In accordance with yet another aspect of the present invention, there is provided an audio/video (A/V) device, including an OSD processing unit to OSD process information, and a control unit to control the OSD processing unit so that the OSD processing unit processes functions provided by the A/V device and at least one connected peripheral A/V device.

The control unit may control the OSD processing unit so that the OSD processing unit OSD processes an operational state of the A/V device and an operational state of the peripheral A/V device.

The OSD processing unit may indicate the A/V device and the peripheral A/V device as respective icons.

The control unit may control the OSD processing unit so that the OSD processing unit OSD processes a connection diagram indicating a connection relationship among the respective icons.

The A/V device may comprise either or both of a device corresponding to at least one content source that provides content and a device corresponding to at least one content destination that receives the content from the content source.

The peripheral A/V device may comprise either or both of a device corresponding to at least one content source that provides content and a device corresponding to at least one content destination that receives the content from the content source.

A device corresponding to the content source may include at least one of a DTT, a DVDP, a VCR, and a HDD, and a device corresponding to the content destination may include at least one of the DVDR, the VCR, and the HDD.

In accordance with yet another aspect of the present invention, there is provided a method for controlling an operation of an audio/video (A/V) device, including receiving an OSD screen request signal, and producing and providing an OSD screen, functions provided by the A/V device and at least one connected peripheral A/V device being displayed on the OSD screen.

An operational state of the A/V device and an operational state of the peripheral A/V device may be displayed on the OSD screen, and the A/V device and the peripheral A/V device may be indicated by icons.

Further, a connection diagram indicating a connection relationship among the respective icons may be displayed on the OSD screen.

In accordance with yet another aspect of the present invention, there is provided an audio/video (A/V) device, including an OSD processing unit to OSD process information, and a control unit to control the OSD processing unit so that the OSD processing unit produces an OSD screen, content flow among at least one connected peripheral A/V device being displayed on the OSD screen.

In accordance with yet another aspect of the present invention, there is provided a method for controlling an operation of an audio/video (A/V) device, including receiving an OSD screen request signal, and producing and providing an OSD screen, content flow among at least one connected peripheral A/V device being displayed on the OSD screen.

In accordance with yet another aspect of the present invention, there is provided an audio/video (A/V) device, including an OSD processing unit to OSD process information, and a control unit to control the OSD processing unit so that the OSD processing unit OSD-processes a connection diagram indicating at least one of a connection relationship between the A/V device and at least one connected peripheral A/V device and a connection relationship among the at least one peripheral A/V device.

The control unit may control the OSD processing unit so that the OSD processing unit indicates content-movable paths at least between the A/V device and the peripheral A/V device or among the peripheral A/V devices as a first connection line.

The control unit may control the OSD processing unit so that the OSD processing unit indicates content-moving paths at least between the A/V device and the peripheral A/V device or among the peripheral A/V devices as a second connection line other than the first connection line.

The control unit may control the OSD processing unit so that, when content recording medium is loaded into one of the A/V device and the peripheral A/V device, the OSD processing unit OSD processes a connection diagram between the one device and the others, and the control unit may control the OSD processing unit so that the OSD processing unit eliminates the connection diagram between the one device and the others when the content recording medium is unloaded from the one device.

In accordance with yet another aspect of the present invention, there is provided a method for controlling an operation of an audio/video (A/V) device, including receiving an OSD screen request signal, and producing and providing an OSD screen, a connection diagram indicating at least one of a connection relationship between the A/V device and at least one connected peripheral A/V device and a connection relationship among the at least one peripheral A/V device being displayed on the OSD screen.

Content-movable paths at least between the A/V device and the peripheral A/V device or among the peripheral A/V devices may be displayed on the OSD screen as a first connection line.

Content-moving paths at least between the A/V device and the peripheral A/V device or among the peripheral A/V devices may be displayed on the OSD screen as a second connection line other than the first connection line.

When a content recording medium is loaded into one of the A/V device and the peripheral A/V device, a connection diagram between the one device and the others may be displayed on the OSD screen. The connection diagram between the one device and the others on the OSD screen may be eliminated when the content recording medium is unloaded from the one device.

In accordance with yet another aspect of the present invention, there is provided an audio/video (A/V) device, including an OSD processing unit to OSD process information, and a control unit to control the OSD processing unit so that the OSD processing unit OSD processes operational states of the A/V device and at least one connected peripheral A/V device.

In accordance with yet another aspect of the present invention, there is provided a method for controlling an operation of an audio/video (A/V) device, including receiving an OSD screen request signal, and producing and providing an OSD screen, operational states of the A/V device and at least one connected peripheral A/V device being displayed on the OSD screen.

In accordance with yet another aspect of the present invention, there is provided an audio/video (A/V) device, including an OSD processing unit to OSD process information, and a control unit to control the OSD processing unit so that the OSD processing unit OSD processes content flow between the A/V device and at least one connected peripheral A/V device and changes the OSD in response to change in the content flow between the A/V device and the at least one peripheral A/V device.

In accordance with yet another aspect of the present invention, there is provided a method for controlling an operation of an audio/video (A/V) device, including receiving an OSD screen request signal, and producing and providing an OSD screen, content flow between the A/V device and at least one connected peripheral A/V device being displayed on the OSD screen, and when the content flow between the A/V device and the at least one peripheral A/V device is changed, changing the OSD screen in response to the change in the content flow.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a block diagram of a combination A/V device according to an embodiment of the present invention;

FIG. 3 is a flowchart of a method of controlling the operation of a combination A/V device, such as that shown in FIG. 2, according to an embodiment of the present invention;

DETAILED DESCRIPTION OF THE PREFERRED EMBODIMENTS

Figure 1:
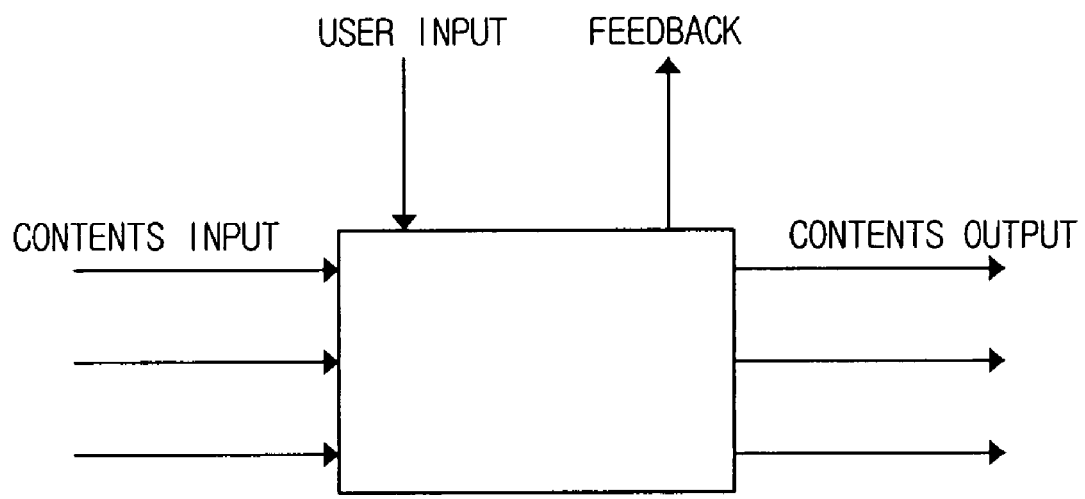
FIG. 1 is a schematic representation of the operation of a conventional A/V device.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 2 is a block diagram of a combination A/V device according to an embodiment of the present invention.

The combination A/V device according to an embodiment may be a combination system that may be implemented by incorporating two or more A/V devices each performing independent functions, such as a television (TV), a digital terrestrial television (DTT), a video cassette recorder (VCR), a digital versatile disk player (DVDP), a DVD recorder (DVDR), a set-top box (STB), or the like. In this embodiment, a combination system in which a DTT, a VCR, and a DVDR are incorporated into a single set will be described by way of example.

Referring to FIG. 2, the combination A/V device according to the present invention may be composed of a DTT unit 100, a VCR unit 200, and a DVDR unit 300. The DTT unit 100 may be a digital broadcasting set top box for tuning and demodulating an external digital broadcasting signal. The VCR unit 200 may be a recording and reproducing apparatus that records or reproduces A/V data in or from a magnetic recording medium such as a VCR tape. The DVDR unit 300 may be a recording and reproducing apparatus that records or reproduces A/V data in or from an optical recording medium, such as a compact disk (CD), a DVD, or the like.

Further, the combination A/V device according to an embodiment of the present invention may be connected to, and used with, an external display device 400 such as a TV. A broadcasting signal received by the DTT unit 100 or an A/V signal reproduced by the VCR unit 200 or the DVDR unit 300 may be output to the external display device 400.

The DTT unit 100 may include a tuner 110, a demodulating unit 120, a decoder 130, and a DTT control unit 140. The tuner 110 may tune in one channel, selected by the user, among a plurality of channels, which may be received as digital broadcasting signals from ground waves, a satellite, a cable, or the like.

The demodulating unit 120 may demodulate the digital broadcasting signal received from the tuner 110, and demultiplex the demodulated broadcasting signal into a video signal, an audio signal and a broadcasting information signal.

The decoder 130 may decode the demultiplexed video, audio and broadcasting information signals. The video and audio signals contained in the digital broadcasting signal received by the tuner 110 may be signals compressed into a given format. The decoder 130 also may decompress the compressed video and audio signals. The compressed video and audio signals may be in a moving picture experts group (MPEG) format.

The DTT control unit 140 may control an overall operation of the DTT unit 100. For example, the DTT control unit 140 may control the tuning operation of the tuner 110, the decoding operation of the decoder 130, and the like under the control of a DVDR control unit 390 (described below).

The VCR unit 200 may include a VCR deck unit 210, a VCR signal processing unit 220, and a VCR control unit 230.

The VCR deck unit 210 may record data on the magnetic tape, or read the data from the magnetic tape to output the data to an A/V switching unit 340 (described below under the control of the VCR control unit 230.

The VCR signal processing unit 220 may convert the data from the A/V switching unit 340 into a format that is recordable in the magnetic tape under the control of the VCR control unit 230. The VCR signal processing unit 220 also may convert the data, read by the VCR deck unit 210, into a format that can be displayed on the external display device 400.

The VCR control unit 230 may control an overall operation of the VCR unit 200. For example, the VCR control unit 230 may control the recording and reproducing operations of the VCR deck unit 210 under the control of the DVDR control unit 390.

The DVDR unit 300 may include an external input terminal 310, a DVDR deck unit 320, an MPEG coder/decoder (MPEG CODEC) 330, an A/V switching unit 340, an A/V signal processing unit 350, an external output terminal 360, an OSD processing unit 370, a front panel 380, and a DVDR control unit 390.

The external input terminal 310 may be connected to external A/V devices such as a digital camcorder, a digital camera, or the like. The external input terminal 310 may receive A/V signals from external A/V devices and apply them to the A/V switching unit 340.

The DVDR deck unit 320 may record or read data in or from a loaded optical recording medium under the control of the DVDR control unit 390. The data read by the DVDR deck unit 320 may be provided to the MPEG CODEC 330.

The MPEG CODEC 330 may compress to-be-recorded data into a signal of a given format and apply the compressed signal to the DVDR deck unit 320. The MPEG CODEC 330 also may decode the data read by the DVDR deck unit 320.

The A/V switching unit 340 may establish a delivery path for A/V signals under the control of the DVDR control unit 390. For example, the A/V switching unit 340 may apply either or both of A/V signals from the DTT unit 100, the VCR unit 200, the external input terminal 310 and the MPEG CODEC 330 to the A/V signal processing unit 350. The A/V switching unit 340 also may apply one of the A/V signals from the DTT unit 100 and the external input terminal 310 to the VCR signal processing unit 220 or the MPEG CODEC 330 under the control of the DVDR control unit 390.

The A/V signal processing unit 350 may convert the A/V data, which may be received from the decoder 130 of the DTT unit 100 or the MPEG CODEC 330 via the A/V switching unit 340, into a format that is displayable on the external display device 400 under the control of the DVDR control unit 390. The A/V signal processing unit 350 can bypass the A/V signal from the VCR signal processing unit 220 to the external output terminal 360 without performing separate signal processing.

The external output terminal 360 may be connected to the external display device 400. The external output terminal 360 may output the A/V signal from the A/V signal processing unit 350 to the external display device 400.

The OSD processing unit 370 may provide a user interface (UI) (hereinafter, "menu screen") obtained by on screen display (OSD) processing the flow of content, wherein the flow of content indicates a plurality of modules in the combination A/V device, functions thereof, and the operation of the combination A/V device. The term "module" is used in its broadest sense, and may include, not by way of limitation, content sources, content destinations, content operations, and the like. The OSD menu screen, which may be produced by the OSD processing unit 370, may be provided via the A/V signal processing unit 350 and the external output terminal 360 to the external display device 400 where the OSD menu screen may be displayed.

The front panel 380 may be a user interface for receiving operation instructions to set or select functions supported by the combination A/V device. The front panel 380 may include a keypad 382 equipped with various function keys, and an IR receiving unit 384 for receiving an infrared signal from a remote control 500, which is an external input device.

The DVDR control unit 390 may control the overall operation of the combination A/V device in response to user operation signals from the front panel 380. The DVDR control unit 390 may control the recording and reproducing operations of the DVDR deck unit 320, the compression and decompression operations of the MPEG CODEC 330, the switching operation of the A/V switching unit 340, and the like according to the user's operation signal. In response to the user's operation signal, the DVDR control unit 390 may further control the DTT unit control unit 140 controlling the operation of the DTT unit 100 or the VCR control unit 230 controlling the operation of the VCR unit 200.

It has been shown and described in this embodiment that the DTT unit 100, the VCR unit 200, and the DVDR unit 300 may be provided with separate control units 140, 230 and 390 that control the functions and operations thereof, respectively, wherein the DVDR control unit 390 in the DVDR unit 300 may function as a main control unit. Although it has been illustrated in this embodiment that the DVDR control unit 390 is allocated as the main control unit for the combination A/V device, the present invention is not limited to such a configuration. That is, it will be apparent that the DTT control unit 140 or the VCR control unit 230 may perform the function of the main control unit. In addition, it will be apparent that the control units 140, 230 and 390, which control the respective units 100, 200 and 300, may be implemented as a single control unit rather than such separate units.

Hereinafter, an exemplary process of controlling the operation of the combination A/V device according to an embodiment of the present invention will be described in more detail in conjunction with processing the menu screen.

FIG. 3 is a flowchart of a method of controlling the operation of a combination A/V device, such as that shown in FIG. 2, according to an embodiment of the present invention.

Referring to FIG. 3, when receiving a menu screen request signal via the IR receiving unit 384 from the remote control 500 (S610), the DVDR control unit 390 may control the OSD processing unit 370, the A/V signal processing unit 350, and the external output terminal 360 so that a menu screen indicating the operation of the combination A/V device as content flow may be displayed on the external display device 400 (S620). According to an embodiment of the present invention, the menu screen is provided in response to selecting a 'menu key' (not shown) or a specific key of the remote control 500.

Figure 4A:
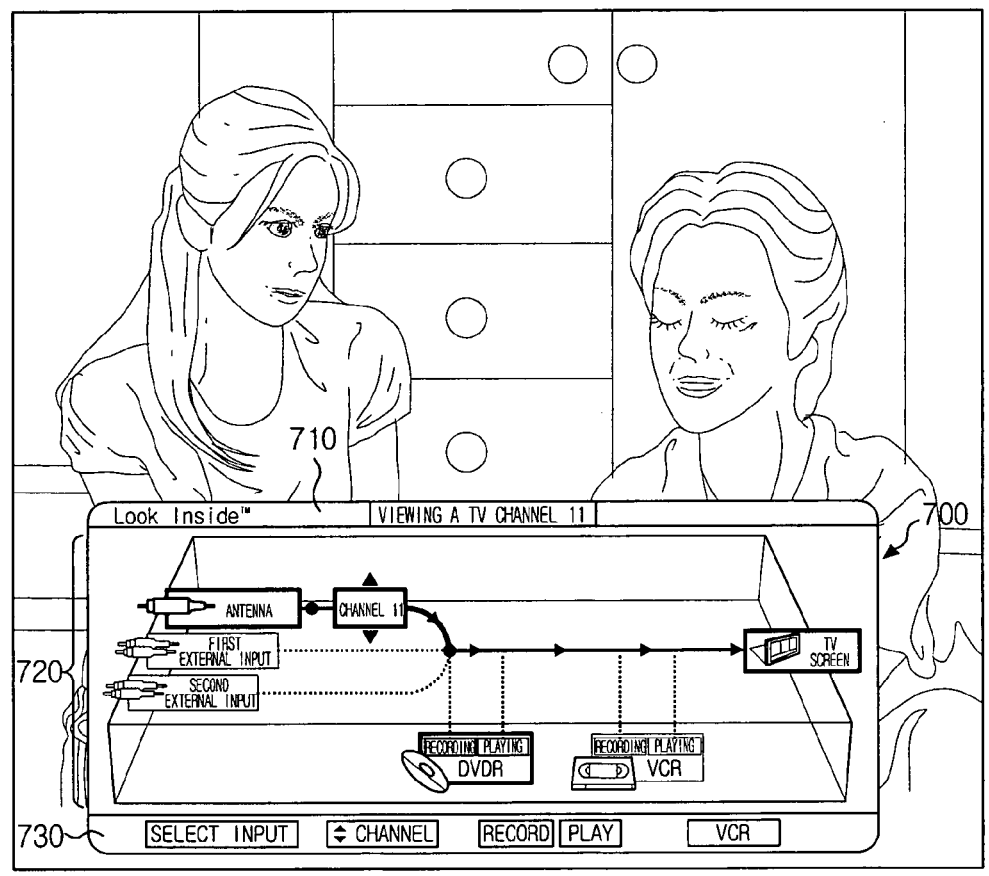
FIGS. 4A to 4L are schematic representations of an exemplary menu screen produced by an OSD processing unit, such as that shown in FIG. 2, to illustrate a process in which the flow path of content is changed according to a user's operation, according to an embodiment of the present invention.

FIG. 4A is a schematic representation of an exemplary menu screen that an OSD processing unit provides in response to a menu screen request signal, according to an embodiment of the present invention.

As shown in FIG. 4A, a menu screen 700 may be composed of a first region 710 where information as to a current operational state of the combination A/V device may be displayed, a second region 720 where icon information for a plurality of modules constituting the combination A/V device and information for operational states of the respective modules may be displayed, and a third region 730 where keys of the remote control 500 may be displayed.

Icon information indicating the modules constituting the combination A/V device and the functions thereof in a text and icon format, and a connection diagram indicating a connection relationship between the respective icons may be displayed in the second region 720. Here, the connection diagram may include a first connection line (e.g., a solid line) indicating a path via which the content actually moves in response to the user's selection and additional connection lines (e.g., dotted line) indicating paths via which the content may move.

Although in this embodiment all paths among the respective icons via which the content may move may be displayed, the present invention is not limited to such a configuration. That is, it will be apparent that only paths via which the content may actually move may be displayed depending on the states of the respective modules. For example, the DVDR control unit 390 may determine whether an optical recording medium or a magnetic tape is loaded into the DVDR deck unit 320 or the VCR deck unit 210 and control the additional connection lines to be selectively displayed. That is, when it is determined that the recording medium is loaded into the VCR deck unit 210 or the DVDR deck unit 320, the DVDR control unit 390 may control the connection diagram between the icon indicating the VCR or the DVDR and other icons to be displayed. Meanwhile, when it is determined that the recording medium is unloaded from the VCR deck unit 210 or the DVDR deck unit 320, the DVDR control unit 390 may control the connection diagram between the icon indicating the VCR or the DVDR and the other icons to be eliminated. It will be apparent that with this method, the DVDR control unit 390 may determine whether content is input from the external input module and, if so, control the connection diagram indicating a connection relationship between the icon corresponding to the external input module and the other icons to be selectively displayed.

Further, in an embodiment of the present invention, an operational situation of the combination A/V device may be indicated by the flow of the content, and in turn the flow of the content may be indicated by content transfer from a content source to a content destination.

In FIG. 4A, icons indicating an antenna, a first external input, and a second external input are modules corresponding to the content sources. An icon indicating a TV screen is a module corresponding to the content destination. Further, icons indicating the DVDR and the VCR are modules corresponding to both the content source and the content destination. That is, when the DVDR or the VCR performs a recording function, it may become the content destination and, when the DVDR or VCR performs a reproducing function, it may become the content source.

Keys of the remote control 500 for selecting the various icons displayed in the second region 720 may be displayed in the third region 730. That is, an input selection key for selecting an external input, a channel UP/DOWN key for selecting a broadcasting channel, a DVDR recording/reproducing key, and a VCR key may be displayed in the third region 730.

The user can select a desired function by operating the icons displayed on the menu screen 700 or the keys of the remote control 500 corresponding to the icons displayed on the menu screen 700 (S630). The DVDR control unit 390 may perform the function selected by the user and change the flow of the content depending on the selected content source and content destination (S640). The DVDR control unit 390 may control the OSD processing unit 370 to change the menu screen 700 in response to the change in the content flow.

When receiving a menu screen close key signal through the front panel 380 (S650), the DVDR control unit 390 may close the menu screen 700 (S660).

Figure 4B:
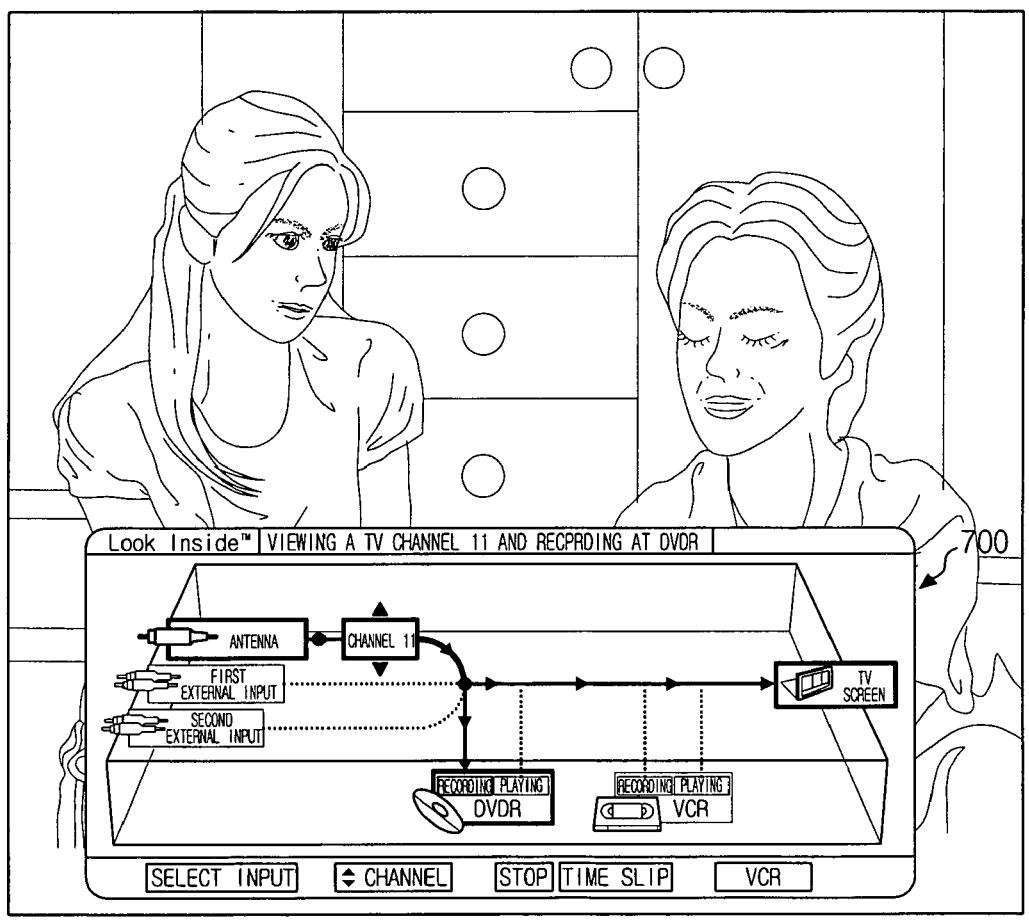

An exemplary process of changing the flow of the content according to a user's key operation will be discussed. First, if a DVDR recording function is selected while the antenna is selected as the content source and the TV screen as the content destination as in FIG. 4A, the flow of the content may be changed as shown in FIG. 4B. FIG. 4B shows that the content received through the antenna is being output on the TV screen and simultaneously is being recorded by the DVDR. The information displayed in the first region 710 of the menu screen 700, the path of the content flow displayed in the second region 720, and the keys of the remote control 500 displayed in the third region 730 may change with the change in the content source or the content destination. Further, icons corresponding to the modules that are currently operating by means of the user's selection may be embodied by various methods such as highlight processing, shaded display processing, color conversion processing, or the like to allow the user to easily recognize the operational state of the modules.

Figure 4C:
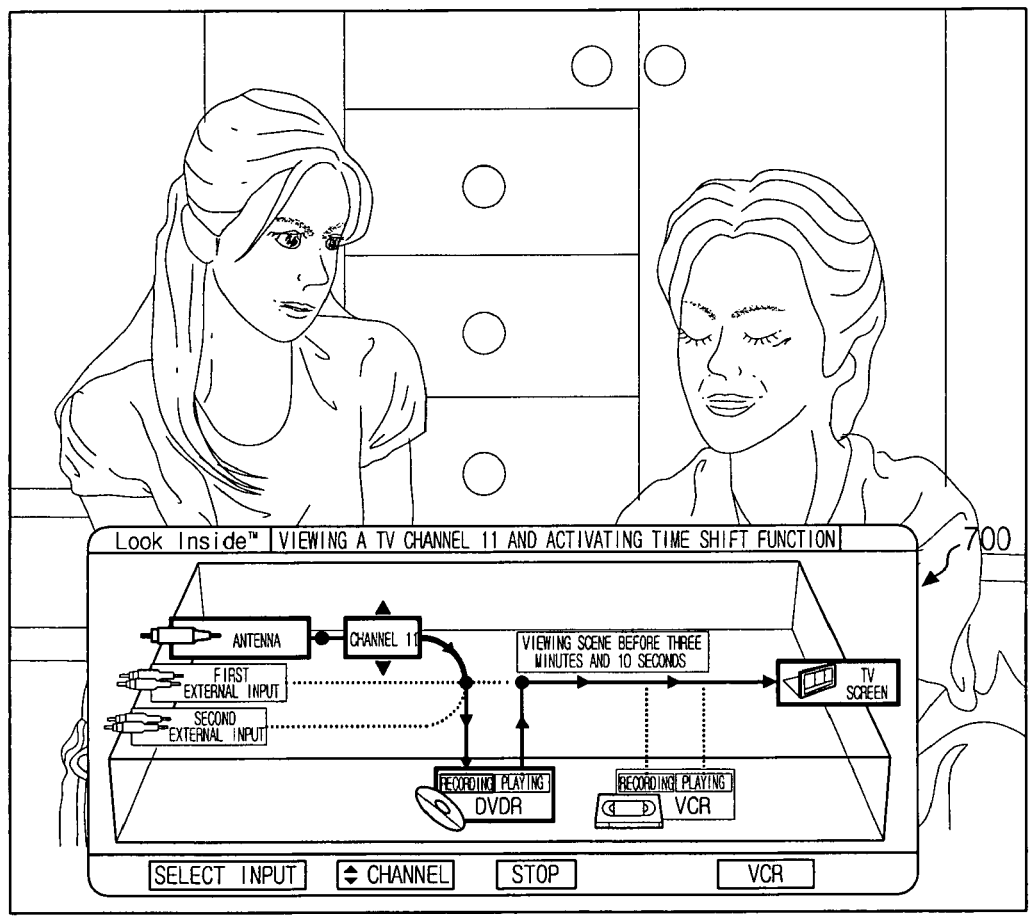

If a time slip function is selected by the operation of the remote control 500 while the content received through the channel numbered 11 is being output on the TV screen and simultaneously is being recorded by the DVDR as in FIG. 4B, the flow path of the content is changed as shown in FIG. 4C. The time slip function may be a function by which simultaneous recording and reproducing are possible. The DVDR control unit 390 may control the DVDR deck unit 320 so that the DVDR deck unit 320 continues to record the content received via the antenna on the optical recording medium loaded into the DVDR deck unit 320 in response to selecting the time slip function, and simultaneously, reproduce scenes recorded on the optical recording medium in response to selecting the recording function. The user can recognize, from the content flow displayed on the menu screen 700, that the content received via the antenna is being currently recorded on the optical recording medium and simultaneously the user is viewing on the TV screen the content recorded three minutes and ten seconds earlier.

Figure 4D:
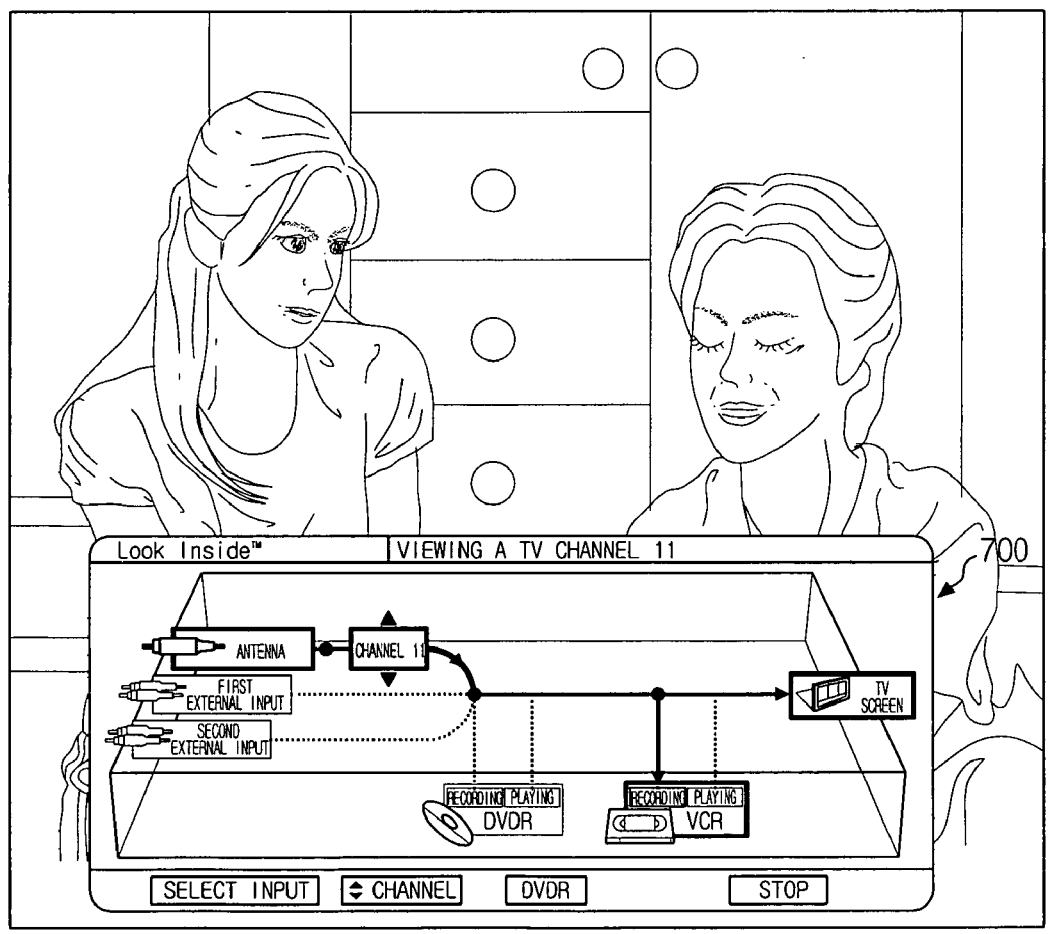

FIG. 4D shows content flow when a VCR recording function is selected by a user's operation as shown in FIG. 4D. It shows that the content received via the antenna may be provided to both the VCR and the TV screen. Accordingly, the user can recognize that the content being currently displayed on the TV screen is the content received via the channel numbered 11, and that the content being currently displayed on the TV screen is being recorded by the VCR.

Figure 4E:
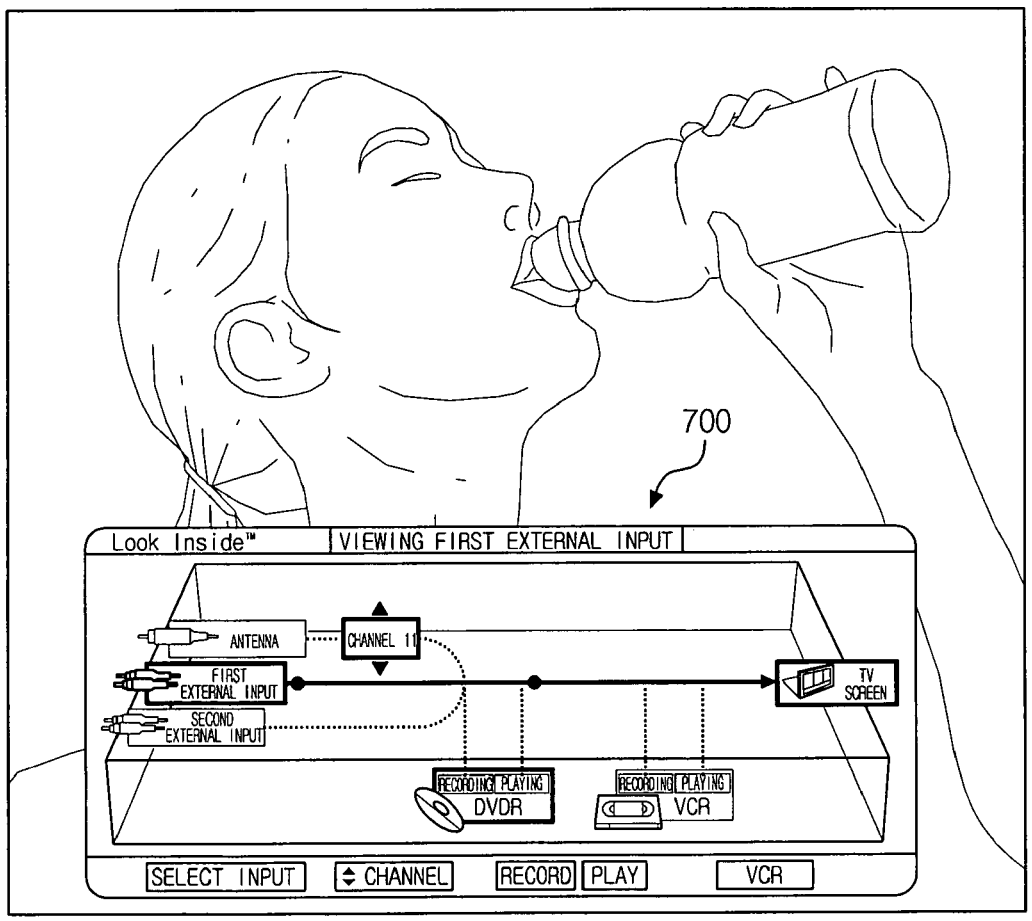
Figure 4F:
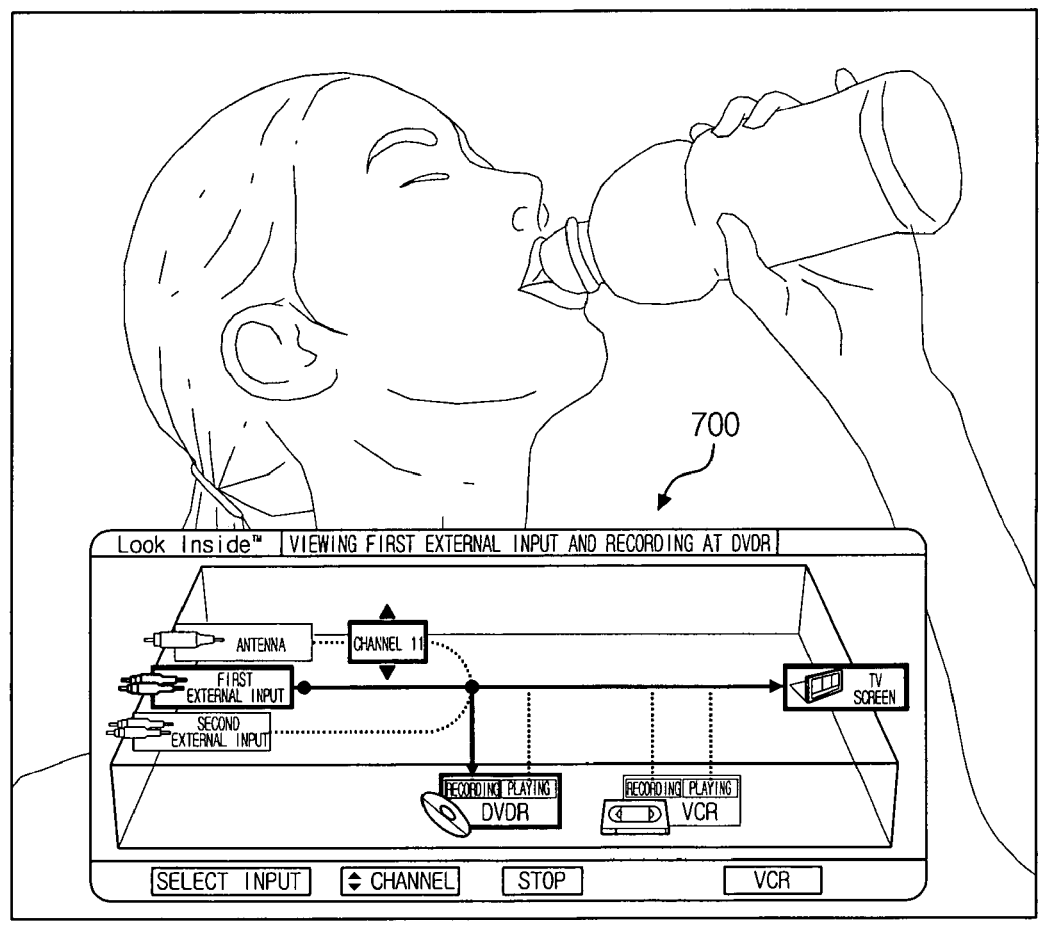

FIG. 4E shows content flow when the first external input is selected as the content source and the TV screen as the content destination. The user can recognize, from the menu screen 700 as shown in FIG. 4E, that the currently viewed content is the content received via the first external input. Further, FIG. 4F shows content flow when the DVDR recording function is selected under the state as shown in FIG. 4E. The user can recognize that the content that the user is currently viewing on the TV screen is the content received via the first external input, and simultaneously, that the content received via the first external input is being recorded by the DVDR.

Figure 4G:
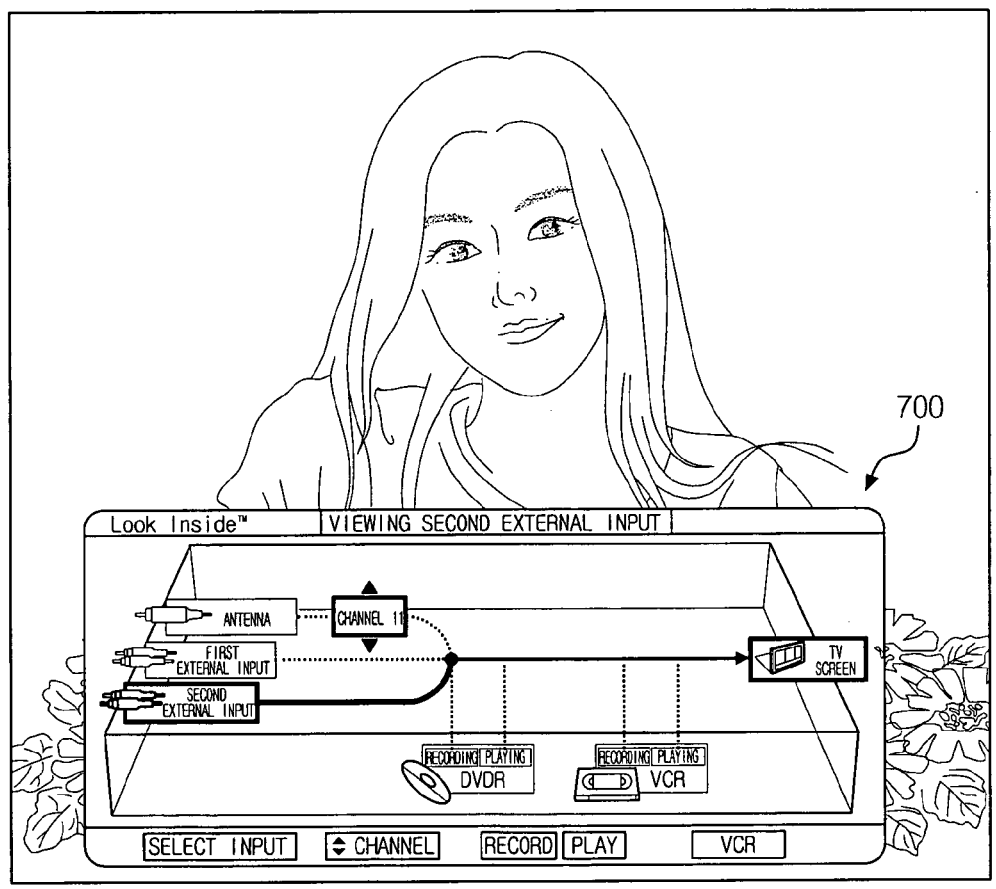
Figure 4H:
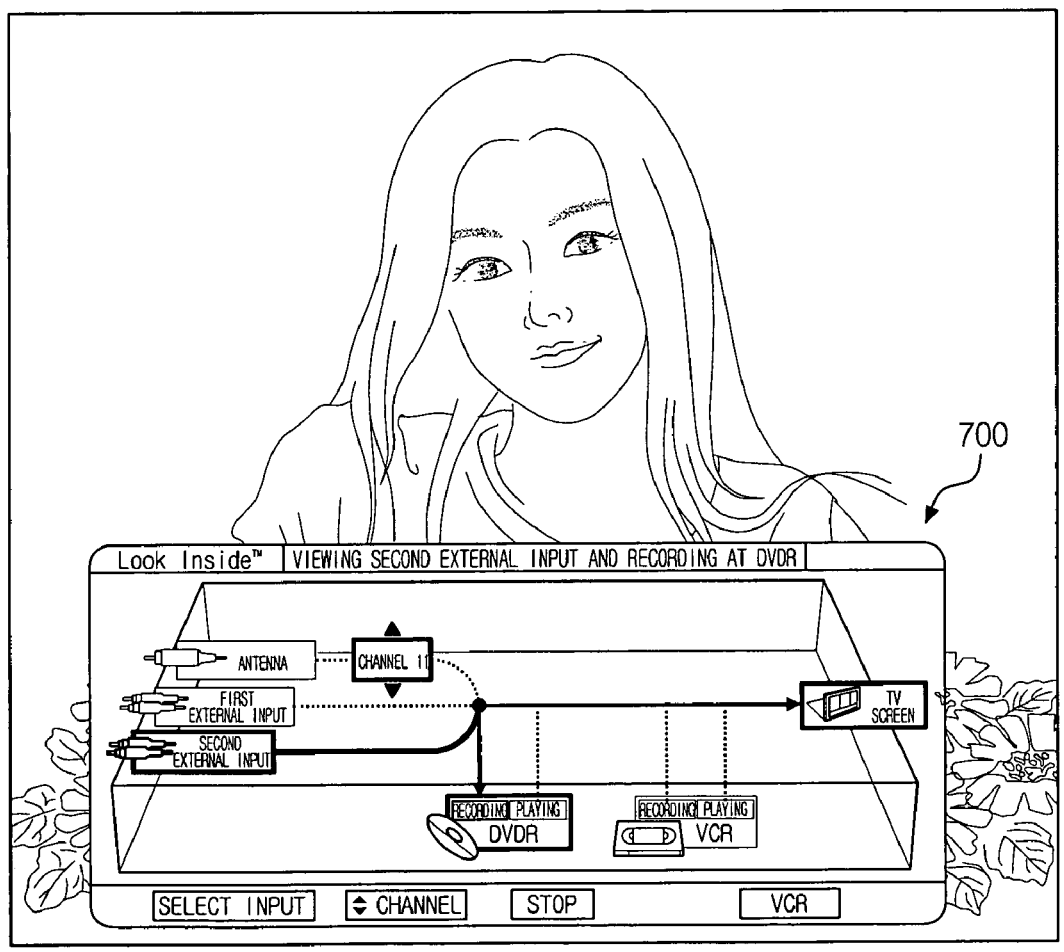

FIG. 4G shows content flow when the second external input is selected as the content source and the TV screen as the content destination. The user can recognize, from the menu screen 700, that the content received via the second external input is being provided to the TV screen. In other words, the user can recognize that the content that the user is currently viewing on the TV screen is the content received via the second external input. FIG. 4H shows content flow when the DVDR recording function is selected in the state as shown in FIG. 4G. The user can recognize that the scenes that the user is currently viewing on the menu screen 700 is the content received via the second external input and that the content received via the second external input is being recorded by the DVDR.

Figure 4I:
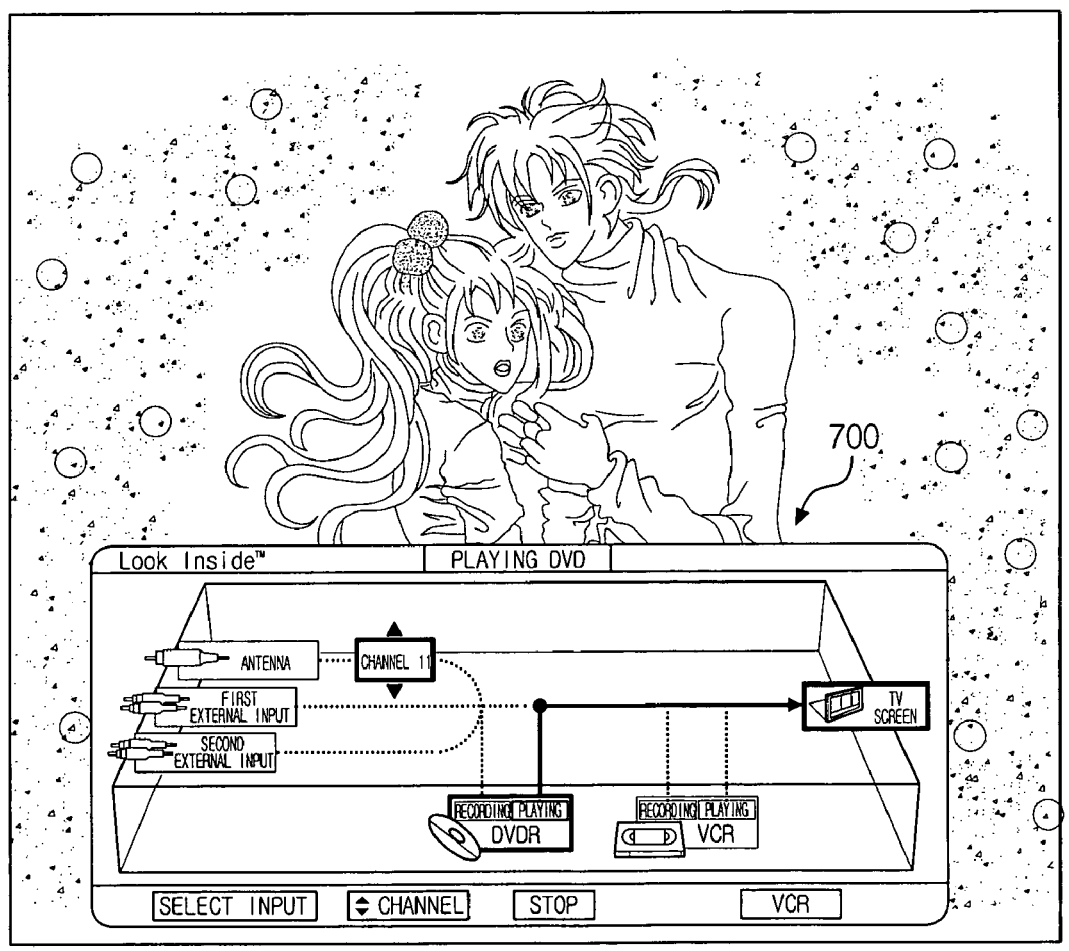
Figure 4J:
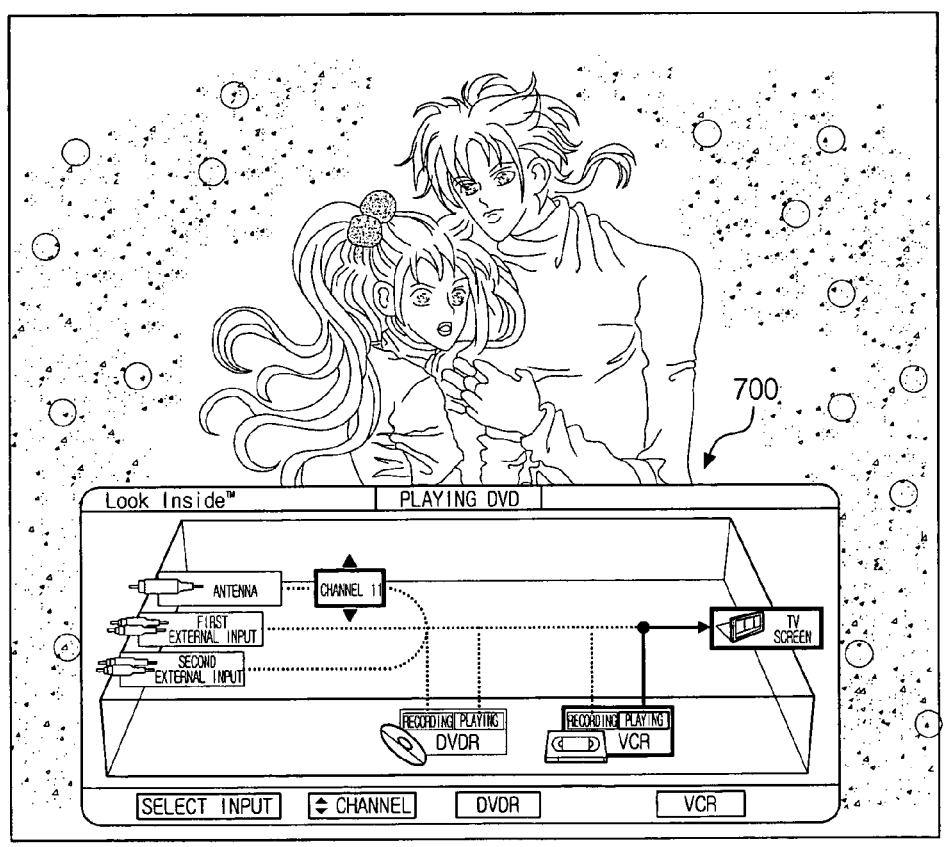

FIG. 4I shows content flow when the DVDR is selected as the content source and the TV screen as the content destination. The user can recognize that the recorded content in the DVDR is being reproduced. FIG. 4J shows content flow when the VCR is selected as the content source and the TV screen as the content destination. The user can recognize, from the menu screen 700, that the recorded content in the VCR is being currently reproduced.

Figure 4K:
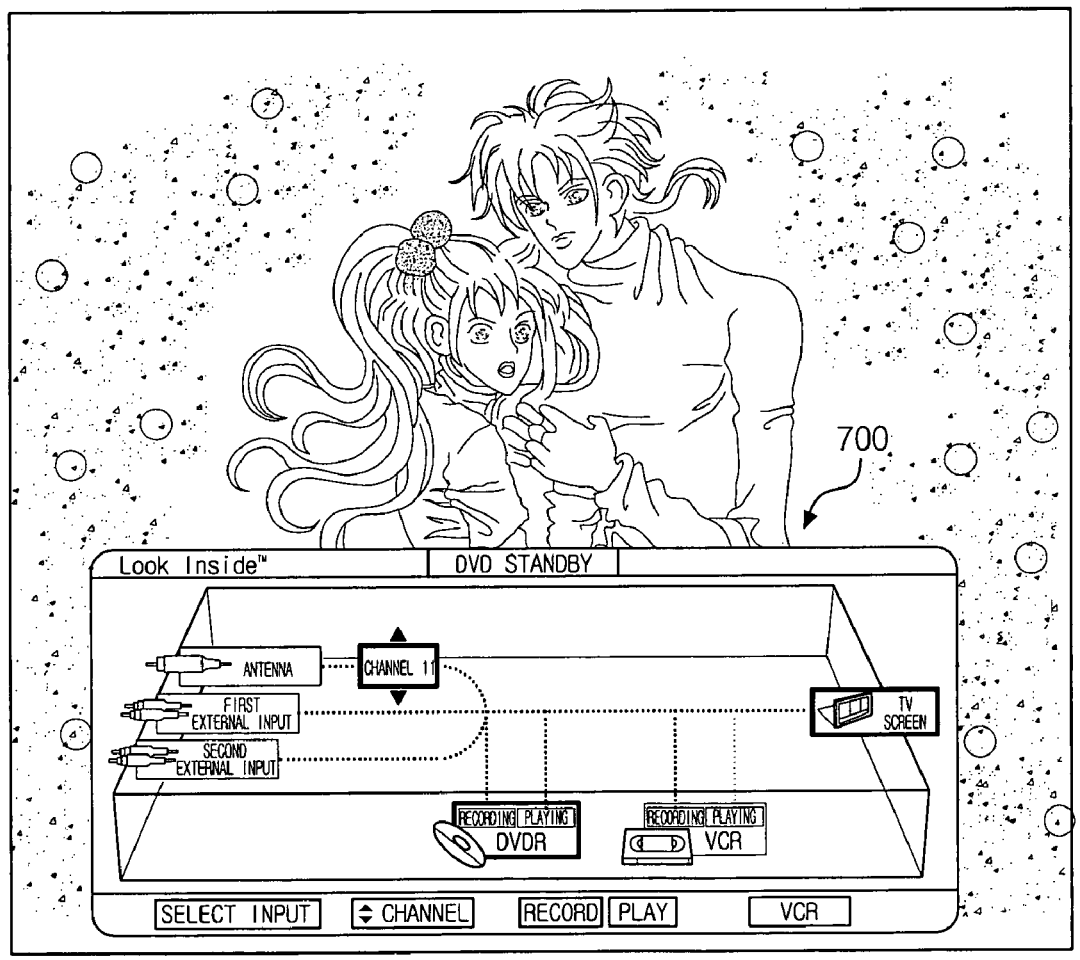
Figure 4L:
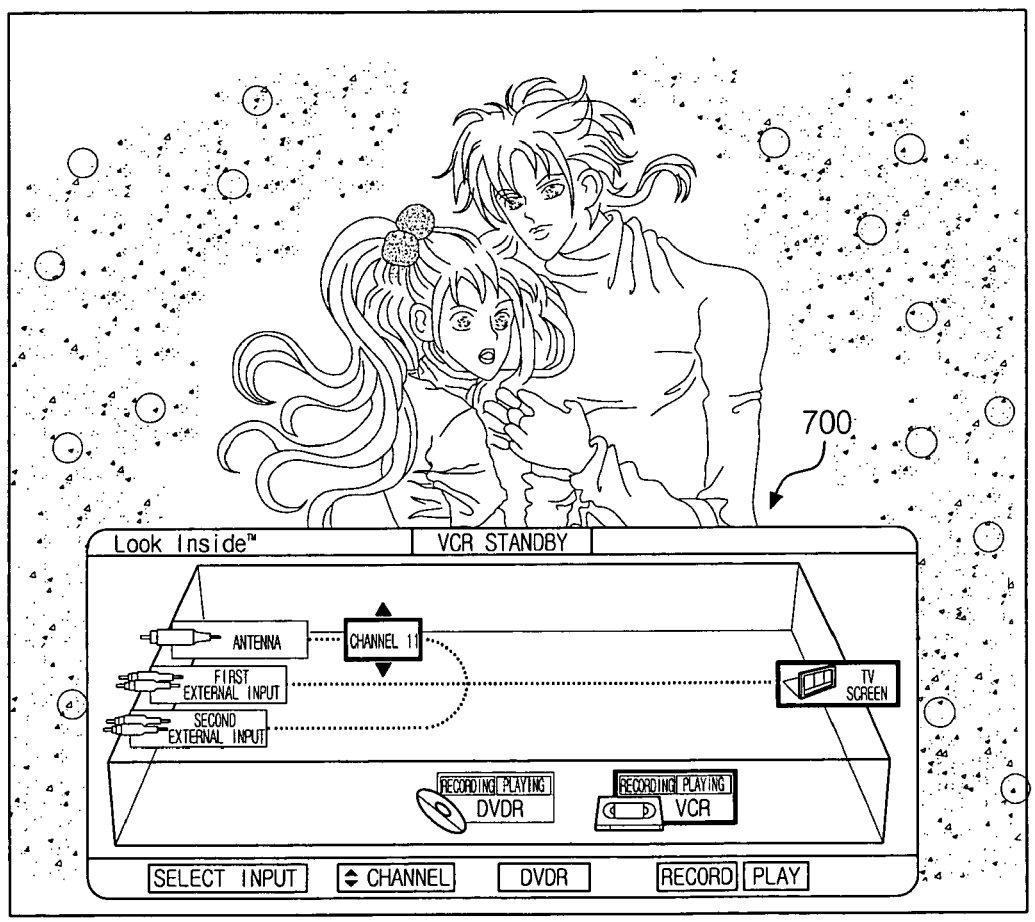

FIG. 4K shows that the DVDR is in a standby state, wherein the DVDR is selected as the content source while no content destination is selected. In other words, it means that the optical recording medium which is a recording and/or reproducing object has been loaded into the DVDR deck unit 320. Further, FIG. 4L shows that the VCR is in a standby state, which means that the VCR is selected as the content source while no content destination is selected. That is, it means that the magnetic tape has been loaded into the VCR deck unit 210.

Meanwhile, although in this embodiment the content flow is indicated with a different color depending on the type of the selected content source, which visually highlights the flow of the content to allow the user to easily recognize it, the present invention is not limited to such a configuration. That is, it will be apparent that the content flow may be indicated by a number of representations, including not by way of limitation, animation, such that the content flow is implemented as if the content actually appears to move.

Further, according to an embodiment, the menu screen 700 may be displayed to overlap the content on the TV screen, as shown in FIGS. 4a to 4l. Alternatively, it will be apparent that the menu screen 700 may be displayed separately from the content on the TV screen.

Figure 5:
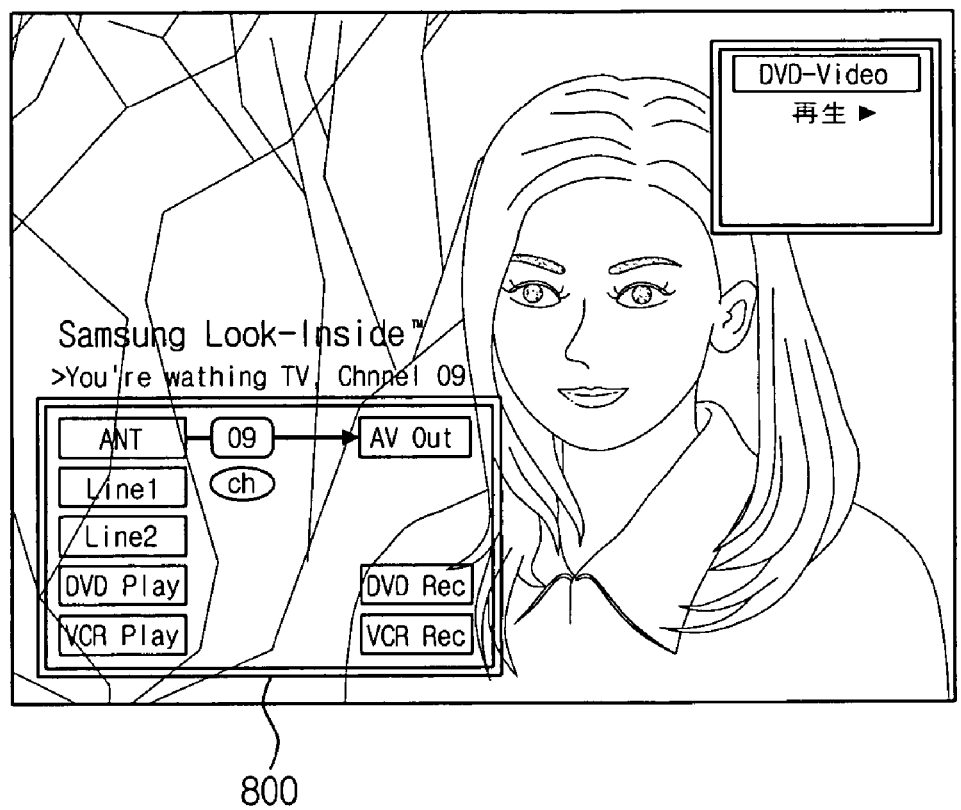
FIG. 5 is a schematic representation of another exemplary menu screen produced by an OSD processing unit, such as that shown in FIG. 2, to illustrate a process in which the flow path of content is changed according to a user's operation, according to an embodiment of the present invention.

Alternatively, a menu screen 800 may be transparent, as shown in FIG. 5. Advantageously, it is possible to view the content on the TV screen even though it is overlapped by the menu screen 800, when the menu screen 800 is transparent as in FIG. 5.

In FIG. 5, the content source and the content destination may be displayed separately on the menu screen 800. However, the operation may be similar with that of the menu screen 700 as shown in FIGS. 4a to 4l. Accordingly, a detailed description thereof will be omitted.

Meanwhile, although, in an embodiment, the combination system in which a DDT unit 100, a VCR unit 200 and a DVDR unit 300 are combined into one set has been described by way of example, the present invention is not limited to such a configuration. That is, the combination A/V device according to the present invention is not necessarily required to include all of the units, e.g. a DTT unit 100, a VCR unit 200, and a DVDR unit 300. Further, the respective units are not necessarily required to be combined into one set. That is, it will be apparent that the present invention is applicable to A/V network devices connection diagramed over a communication network.

Figure 6:
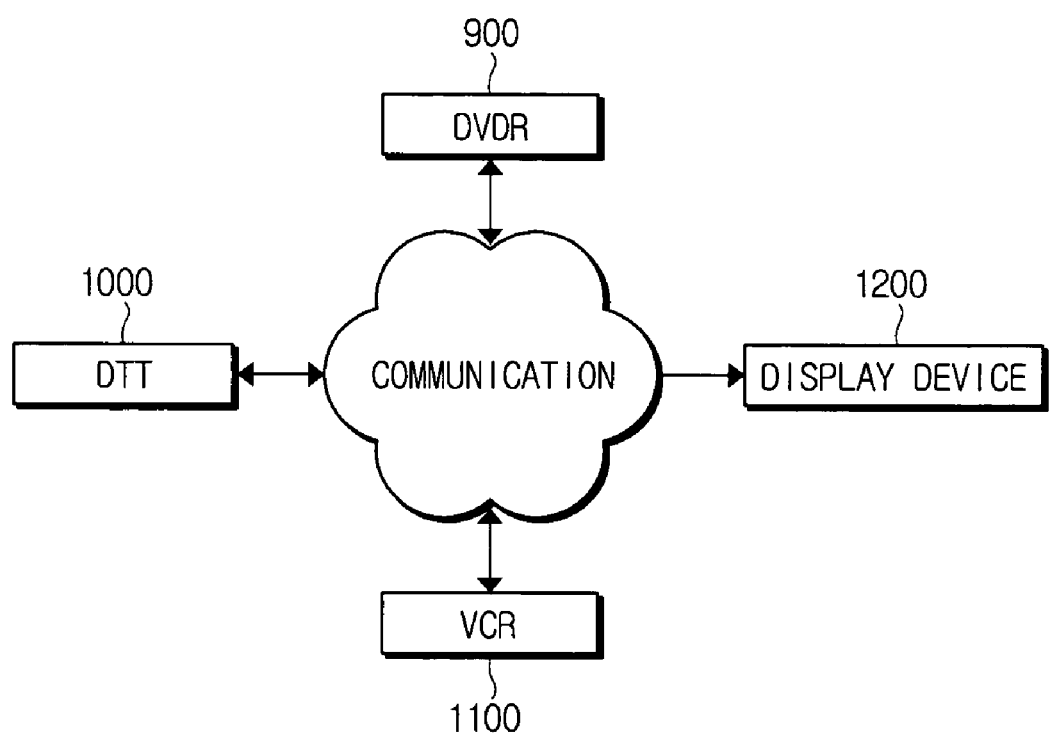
FIG. 6 is a schematic representation of an A/V system according to another embodiment of the present invention.

FIG. 6 is a schematic representation of an A/V system according to another embodiment of the present invention.

As shown in FIG. 6, the A/V system according to an embodiment of the present invention may include a DVDR 900, a DTT 1000, a VCR 1100 and a display device 1200. The respective devices may be connection diagramed over a communication network such as a wired and wireless local area network (LAN). Here, the DVDR 900, the DTT 1000, and the VCR 1100 are devices that may correspond to content sources, and the DVDR 900, the VCR 1100 and the display device 1200 are devices that may correspond to content destinations.

The A/V system according to this embodiment is different from the combination A/V device as shown in FIG. 1 in that the DVDR 900, the DTT 1000, the VCR 1100 and the display device 1200 may be connection diagramed over the communication network. However, both A/V devices may be similar to each other in terms of a process of OSD processing and displaying operational states of the respective devices, a connection relationship among the respective devices, and the flow of content, and accordingly, a detailed description thereon will be omitted.

As such, it will be apparent that, even when the present invention is applied to an A/V system, it may be required to have a main device that controls at least one A/V device connected over a communication network, as in the combination A/V device as shown in FIG. 2. For example, when the DVDR 900 is set as the main device that controls at least one A/V device connected over the communication network, the DVDR 900 may provide an OSD screen, which may be obtained by OSD processing operational states of the peripheral A/V devices (i.e., DTT 1000, VCR 1100, and display device 1200) connected to the DVDR 900 over the communication network, the connection relationship among the respective devices, and the flow of the content, in response to a user's request.

It will be apparent that the present invention is also applicable to A/V devices connection diagramed via a cable, as well as the A/V network devices connection diagramed over a communication network as described above.

As described, according to embodiments of the present invention, it is possible for a user to easily recognize the operations in or among A/V devices, by providing a user interface in which the operations in A/V devices or among A/V network devices connected over a network are visualized into flow of content. It provides convenient operations for a user.

Further, according to the present invention, it is possible for a user to easily recognize a connection relationship in or among A/V devices by OSD processing and providing the connection diagram in or between the A/V devices. As such, the present invention is effectively applicable to A/V devices capable of handling a number of sources and/or destinations of content and performing a number of tasks on the contents.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A combination audio/video (A/V) arrangement, comprising:
a plurality of modules incorporated into a single arrangement and corresponding to a plurality of A/V devices each performing an independent function;
an on screen display (OSD) processing unit to OSD-process information; and
a control unit to control the OSD processing unit to process information related to internal operations of the single arrangement including the plurality of modules wherein the internal operations of the single arrangement include independent functions of the plurality of modules, wherein
the control unit controls the OSD processing unit to display an icon on the screen for selecting a desired function, while also displaying a corresponding icon as it appears on a remote control to facilitate selection of the desired function with the remote control.

2. The arrangement as claimed in claim 1, wherein the control unit controls the OSD processing unit to process operational states of respective modules.

3. The arrangement as claimed in claim 1, wherein the control unit controls the OSD processing unit to process an operational state of the A/V arrangement.

4. The arrangement as claimed in claim 1, wherein the OSD processing unit displays the plurality of modules as icons.

5. The arrangement as claimed in claim 4, wherein the control unit controls the OSD processing unit to process a connection diagram indicating a connection relationship among respective icons.

6. The arrangement as claimed in claim 1, wherein the plurality of modules comprise:
a module corresponding to at least one content source that provides content; and
a module corresponding to at least one content destination that receives the content from the content source.

7. The arrangement as claimed in claim 6, wherein the module corresponding to the content source comprises at least one of an external input module, a digital versatile disk (DVD) reproducing module, a video cassette recorder (VCR) reproducing module, and a hard disc drive (HDD) reproducing module, and the module corresponding to the content destination comprises at least one of a DVD recording module, a VCR recording module, a HDD storage module, and an external output module.

8. A method of controlling an operation of a combination audio/video (A/V) arrangement, the method comprising:
receiving an OSD screen request signal; and
producing and providing an OSD screen that displays information related to a plurality of modules incorporated into a single arrangement and corresponding to a plurality of A/V devices each performing an independent function and further displays the independent functions thereof, wherein
an icon is displayed on the screen for selecting a desired function, while also displaying a corresponding icon as it appears on a remote control to facilitate selection of the desired function with the remote control.

9. The method as claimed in claim 8, wherein operational states of respective modules are displayed on the OSD screen.

10. The method as claimed in claim 8, wherein an operational state of the A/V arrangement is displayed on the OSD screen.

11. The method as claimed in claim 8, wherein the plurality of modules are displayed as icons.

12. The method as claimed in claim 11, wherein a connection diagram indicating a connection relationship among respective icons is displayed on the OSD screen.

13. The method as claimed in claim 8, wherein the plurality of modules comprises:
   a module corresponding to at least one content source that provides content; and
   a module corresponding to at least one content destination that receives the content from the content source.

14. The method as claimed in claim 13, wherein the module corresponding to the content source comprises at least one of an external input module, a DVD reproducing module, a VCR reproducing module, and a HDD reproducing module, and the module corresponding to the content destination comprises at least one of a DVD recording module, a VCR recording module, a HDD storage module, and an external output module.

15. A combination audio/video (A/V) arrangement, comprising:
   a plurality of modules incorporated within a single arrangement and corresponding to a plurality of A/V devices each performing an independent function;
   an OSD processing unit to OSD-process information; and
   a control unit to control the OSD processing unit to produce an OSD screen displaying a flow of content among the plurality of modules incorporated within the single arrangement, wherein
   the control unit controls the OSD processing unit to display an icon on the screen for selecting a desired function, while also displaying a corresponding icon as it appears on a remote control to facilitate selection of the desired function with the remote control.

16. The arrangement as claimed in claim 15, wherein the flow of the content is displayed as content transfer from a content source to a content destination.

17. The arrangement as claimed in claim 15, wherein the flow of the content is expressed by animation.

18. The arrangement as claimed in claim 16, wherein the content flow is changed with change in either or both of the content source and the content destination.

19. The arrangement as claimed in claim 15, wherein a module corresponding to at least one content source and a module corresponding to at least one content destination that receives the content from the content source are displayed on the OSD screen.

20. The arrangement as claimed in claim 19, wherein icon information obtained by OSD-processing functions of respective modules is further displayed on the OSD screen.

21. The arrangement as claimed in claim 19, wherein the module corresponding to the content source comprises at least one of an external input module, a DVD reproducing module, a VCR reproducing module, and a HDD reproducing module, and the module corresponding to the content destination comprises at least one of a DVD recording module, a VCR recording module, a HDD storage module, and an external output module.

22. The arrangement as claimed in claim 19, wherein the control unit controls the OSD processing unit to process functions provided by respective modules.

23. A method of controlling an operation of a combination audio/video (A/V) arrangement, the method comprising:
   receiving an OSD screen request signal; and
   producing and providing an OSD screen that displays a flow of content among a plurality of modules corresponding to a plurality of A/V devices each performing an independent function, the plurality of modules each being incorporated within a single arrangement, wherein
   an icon is displayed on the screen for selecting a desired function, while also displaying a corresponding icon as it appears on a remote control to facilitate selection of the desired function with the remote control.

24. The method as claimed in claim 23, wherein the flow of the content is displayed as content transfer from a content source to a content destination.

25. The method as claimed in claim 23, wherein the flow of the content is expressed by animation.

26. The method as claimed in claim 24, further comprising:
   changing flow paths of the content with change in either or both of the content source and the content destination.

27. The method as claimed in claim 23, wherein at least one module corresponding to a content source and at least one module corresponding to a content destination are displayed on the OSD screen.

28. The method as claimed in claim 27, wherein icon information indicating, as an OSD, functions provided by respective modules is further displayed on the OSD screen.

29. The method as claimed in claim 27, wherein the module corresponding to the content source comprises at least one of an external input module, a DVD reproducing module, a VCR reproducing module, and a HDD reproducing module, and the module corresponding to the content destination comprises at least one of a DVD recording module, a VCR recording module, a HDD storage module, and an external output module.

30. The method as claimed in claim 28, wherein a connection diagram indicating a connection relationship among respective icons is displayed on the OSD screen.

31. A combination audio/video (A/V) arrangement, comprising:
   a plurality of modules incorporated within a single arrangement and corresponding to a plurality of A/V devices each performing an independent function;
   an OSD processing unit to OSD-process information; and
   a control unit to control the OSD processing unit to process a connection diagram indicating a connection relationship among the plurality of modules incorporated within the single arrangement, wherein
   the control unit controls the OSD processing unit to display an icon on a screen for selecting a desired function, while also displaying a corresponding icon as it appears on a remote control to facilitate selection of the desired function with the remote control.

32. The arrangement as claimed in claim 31, wherein the control unit controls the OSD processing unit to indicate content-movable paths among the plurality of modules as a first connection line.

33. The arrangement as claimed in claim 32, wherein the control unit controls the OSD processing unit to indicate content-moving paths among the plurality of modules as a second connection line other than the first connection line.

34. The arrangement as claimed in claim 31, wherein the control unit controls the OSD processing unit to process a connection diagram between one module of the plurality of modules and the others, when a content recording medium is loaded into the one module.

35. The arrangement as claimed in claim 34, wherein the control unit controls the OSD processing unit to eliminate the connection diagram between the one module and the others when the content recording medium is unloaded from the one module.

36. The arrangement as claimed in claim 31, wherein the control unit controls the OSD processing unit so that, when content is input from an external input module that is one module of the plurality of other modules, the OSD processing unit OSD processes a connection diagram between the one module and the others.

37. The arrangement as claimed in claim 36, wherein the control unit controls the OSD processing unit so that, when the content input from the external input module is stopped, the OSD processing unit eliminates the connection diagram among the one module and the others.

38. A method of controlling an operation of a combination audio/video (A/V) arrangement, the method comprising:
receiving an OSD screen request signal; and
producing and providing an OSD screen that displays a connection diagram indicating a connection relationship among a plurality of modules incorporated into a single arrangement and corresponding to a plurality of A/V devices each performing an independent function, wherein
an icon is displayed on the screen for selecting a desired function, while also displaying a corresponding icon as it appears on a remote control to facilitate selection of the desired function with the remote control.

39. The method as claimed in claim 38, wherein a content-movable path among the plurality of modules is displayed by a first connection line on the OSD screen.

40. The method as claimed in claim 38, wherein a content-moving path among the plurality of modules is displayed by a second connection line other than the first connection line on the OSD screen.

41. The method as claimed in claim 38, wherein the connection diagram between one module of the plurality of modules and the others is displayed on the OSD screen when a content recording medium is loaded into the one module.

42. The method as claimed in claim 41, wherein the connection diagram between the one module and the others on the OSD screen is eliminated when the content recording medium is unloaded from the one module.

43. The method as claimed in claim 38, wherein when content is input from an external input module that is one module of the plurality of other modules, a connection diagram between the one module and the others is displayed on the OSD screen.

44. The method as claimed in claim 43, wherein when the content input from the external input module is stopped, the connection diagram among the one module and the others on the OSD screen is eliminated.

45. A combination audio/video (A/V) arrangement, comprising:
a plurality of modules incorporated into a single arrangement and corresponding to a plurality of A/V devices each performing an independent function;
an OSD processing unit to OSD-process information; and
a control unit to control the OSD processing unit to process an operational state of the combination A/V arrangement comprised of the plurality of modules incorporated within the single arrangement and operational states of each of the plurality of modules, wherein the control unit controls the OSD processing unit to display an icon on a screen for selecting a desired function, while also displaying a corresponding icon as it appears on a remote control to facilitate selection of the desired function with the remote control.

46. The arrangement as claimed in claim 45, wherein the OSD processing unit displays the plurality of modules as icons.

47. The arrangement as claimed in claim 46, wherein the control unit controls the OSD processing unit to process a connection diagram indicating a connection relationship among respective icons.

48. The arrangement as claimed in claim 45, wherein the plurality of modules comprise:
a module corresponding to at least one content source that provides content; and
a module corresponding to at least one content destination that receives the content from the content source.

49. The arrangement as claimed in claim 48, wherein the module corresponding to the content source comprises at least one of an external input module, a DVD reproducing module, a VCR reproducing module, and a HDD reproducing module, and the module corresponding to the content destination comprises at least one of a DVD recording module, a VCR recording module, a HDD storage module, and an external output module.

50. The arrangement as claimed in claim 45, wherein the operational state comprises at least one of content viewing, content recording, content reproducing, and standby.

51. A method of controlling an operation of a combination audio/video (A/V) arrangement, the method comprising:
receiving an OSD screen request signal; and
producing and providing an OSD screen that displays an operational state of the A/V arrangement comprised of a plurality of modules corresponding to a plurality of A/V devices each performing an independent function and that further displays operational states of each of the plurality of modules, the plurality of modules each being incorporated into a single arrangement, wherein
an icon is displayed on the screen for selecting a desired function, while also displaying a corresponding icon as it appears on a remote control to facilitate selection of the desired function with the remote control.

52. The method as claimed in claim 51, wherein the plurality of modules are displayed as icons.

53. The method as claimed in claim 52, wherein a connection diagram indicating a connection relationship among respective icons is displayed on the OSD screen.

54. The method as claimed in claim 51, wherein the plurality of modules comprises:
a module corresponding to at least one content source that provides content; and
a module corresponding to at least one content destination that receives the content from the content source.

55. The method as claimed in claim 54, wherein the module corresponding to the content source comprises at least one of an external input module, a DVD reproducing module, a VCR reproducing module, and a HDD reproducing module, and the module corresponding to the content destination comprises at least one of a DVD recording module, a VCR recording module, a HDD storage module, and an external output module.

56. The method as claimed in claim 51, wherein the operational state comprises at least one of content viewing, content recording, content reproducing, and standby.

57. A combination audio/video (A/V) arrangement, comprising:
- a plurality of modules incorporated within a single arrangement and corresponding to a plurality of A/V devices each performing an independent function;
- an OSD processing unit to OSD-process information; and
- a control unit to control the OSD processing unit so that the OSD processing unit OSD processes content flow among the plurality of modules incorporated within the single arrangement and when the content flow among the plurality of modules is changed, OSD processes the content flow in response to the change in the content flow, wherein
- the control unit controls the OSD processing unit to display an icon on a screen for selecting a desired function, while also displaying a corresponding icon as it appears on a remote control to facilitate selection of the desired function with the remote control.

58. The arrangement as claimed in claim 57, wherein the content flow indicates content transfer from a content source to a content destination.

59. The arrangement as claimed in claim 58, wherein the content flow is changed with change in either or both of the content source and the content destination.

60. The arrangement as claimed in claim 57, wherein a module corresponding to at least one content source and a module corresponding to at least one content destination that receives the content from the content source are displayed on the OSD screen.

61. The arrangement as claimed in claim 60, wherein the module corresponding to the content source comprises at least one of an external input module, a DVD reproducing module, a VCR reproducing module, and a HDD reproducing module, and the module corresponding to the content destination comprises at least one of a DVD recording module, a VCR recording module, a HDD storage module, and an external output module.

62. The arrangement as claimed in claim 60, wherein the control unit controls the OSD processing unit to process functions provided by the modules corresponding to the content source and the content destination.

63. A method of controlling an operation of a combination audio/video (A/V) arrangement, the method comprising:
- receiving an OSD screen request signal;
- producing and providing an OSD screen that displays content flow among a plurality of modules incorporated into a single arrangement and corresponding to a plurality of A/V devices each performing an independent function; and
- when the content flow among the plurality of modules is changed, changing the OSD screen in response to the change in the content flow, wherein
- an icon is displayed on the screen for selecting a desired function, while also displaying a corresponding icon as it appears on a remote control to facilitate selection of the desired function with the remote control.

64. The method as claimed in claim 63, wherein the flow of the content is displayed as content transfer from a content source to a content destination.

65. The method as claimed in claim 64, wherein the content flow is changed with change in either or both of the content source and the content destination.

66. The method as claimed in claim 63, wherein a module corresponding to at least one content source and a module corresponding to at least one content destination that receives the content from the content source are displayed on the OSD screen.

67. The method as claimed in claim 66, wherein the module corresponding to the content source comprises at least one of an external input module, a DVD reproducing module, a VCR reproducing module, and a HDD reproducing module, and the module corresponding to the content destination comprises at least one of a DVD recording module, a VCR recording module, a HDD storage module, and an external output module.

68. The method as claimed in claim 66, wherein functions provided by the modules corresponding to the content source and the content destination are displayed on the OSD screen.

69. An audio/video (A/V) device, comprising:
- an OSD processing unit to OSD-process information; and
- a control unit to control the OSD processing unit to process functions provided by the A/V device and at least one connected peripheral A/V device in communication over a network to perform as a single unit, the control unit controlling the OSD processing unit to display a connection diagram indicating a connection relationship among a plurality of icons respectively corresponding to the A/V device and the at least one connected peripheral A/V device, wherein the display of the connection diagram is varied according to an operational state of a peripheral A/V device of the at least one connected peripheral A/V device by emphasizing an icon corresponding to the peripheral A/V device to allow the user to easily recognize the operational state of the peripheral A/V device, wherein
- the control unit controls the OSD processing unit to display one of the plurality of icons on a screen for selecting a desired function, while also displaying a corresponding icon as it appears on a remote control to facilitate selection of the desired function with the remote control.

70. The device as claimed in claim 69, wherein the control unit controls the OSD processing unit to OSD-process an operational state of the peripheral A/V device.

71. The device as claimed in claim 69, wherein the A/V device is any one of a device corresponding to at least one content source that provides content and a device corresponding to at least one content destination that receives the content from the content source.

72. The device as claimed in claim 69, wherein the peripheral A/V device is one of a device corresponding to at least one content source that provides content and a device corresponding to at least one content destination that receives the content from the content source.

73. The device as claimed in claim 71 or 72, wherein a device corresponding to the content source comprises at least one of a digital terrestrial television (DTT), a digital versatile disk player (DVDP), a VCR, and a HDD, and a device corresponding to the content destination comprises at least one of the DVDR, the VCR, and the HDD.

74. A method of controlling an operation of an audio/video (A/V) device, comprising:
- receiving an OSD screen request signal; and
- producing and providing an OSD screen that displays functions provided by the A/V device and at least one connected peripheral A/V device in communication over a network to perform as a single unit; and
- displaying, within the OSD screen, a connection diagram indicating a connection relationship among a plurality of icons respectively corresponding to the A/V device and the at least one connected peripheral A/V device, wherein the display of the connection diagram is varied according to an operational state of a peripheral A/V device of the at least one connected peripheral A/V device by emphasizing an icon corresponding to the peripheral A/V device to allow the user to easily recognize the operational state of the peripheral A/V device, wherein one of the plurality of icons is displayed on the screen for selecting a desired selection, while also displaying a corresponding icon as it appears on a remote control to facilitate selection of the desired selection with the remote control.

75. The method as claimed in claim 74, wherein an operational state of the A/V device is displayed on the OSD screen.

76. The method as claimed in claim 74, wherein an operational state of the peripheral A/V device is displayed on the OSD screen.

77. The method as claimed in claim 74, wherein the A/V device is one of a device corresponding to at least one content source that provides content and a device corresponding to a content destination that receives the content from the content source.

78. The method as claimed in claim 74, wherein the peripheral A/V device is one of a device corresponding to at least one content source that provides content and a device corresponding to at least one content destination that receives the content from the content source.

79. The method as claimed in claim 77 or 78, wherein a device corresponding to the content source comprises at least one of a DTT, a DVDP, a VCR, and a HDD, and a device corresponding to the content destination comprises at least one of the DVDR, the VCR, and the HDD.

80. An audio/video (A/V) device, comprising:
an OSD processing unit to OSD process given information; and
a control unit to control the OSD processing unit so that the OSD processing unit produces an OSD screen, content flow among at least one connected peripheral A/V device in communication over a network to perform as a single unit being displayed on the OSD screen and the OSD screen including a first graphical representation indicating a path via which the content actually flows in response to a user's prior selection and a second graphical representation indicating a path via which the content may flow if selected to do so by the user, the first graphical representation and the second graphical representation being displayed in a different format from each other, wherein
the control unit controls the OSD processing unit to display an icon on the screen for selecting a desired selection, while also displaying a corresponding icon as it appears on a remote control to facilitate selection of the desired selection with the remote control.

81. The device as claimed in claim 80, wherein the flow of the content is indicated as content transfer from a content source to a content destination.

82. The device as claimed in claim 81, wherein the flow of the content is expressed by animation.

83. The device as claimed in claim 81, wherein the content flow is changed with change in either or both of the content source and the content destination.

84. The device as claimed in claim 80, wherein a device corresponding to at least one content source and a device corresponding to at least one content destination that receives the content from the content source are displayed on the OSD screen.

85. The device as claimed in claim 84, wherein icon information obtained by OSD-processing functions provided by the respective A/V devices is further displayed on the OSD screen.

86. The device as claimed in claim 84, wherein a device corresponding to the content source comprises at least one of a DTT, a DVDP, a VCR, and a HDD, and a device corresponding to the content destination comprises at least one of the DVDR, the VCR, and the HDD.

87. The device as claimed in claim 84, wherein the control unit controls the OSD processing unit so that the OSD processing unit OSD processes functions provided by respective devices.

88. A method of controlling an operation of an audio/video (A/V) device, comprising:
receiving an OSD screen request signal; and
producing and providing an OSD screen that displays content flow among at least one connected peripheral A/V device in communication over a network to perform as a single unit, the OSD screen including a first graphical representation indicating a path via which the content actually flows in response to a user's prior selection and a second graphical representation indicating a path via which the content may flow if selected to do so by the user, the first graphical representation and the second graphical representation being displayed in a different format from each other, wherein
an icon is displayed on the screen for selecting a desired selection, while also displaying a corresponding icon as it appears on a remote control to facilitate selection of the desired selection with the remote control.

89. The method as claimed in claim 88, wherein the flow of the content is displayed as content transfer from a content source to a content destination.

90. The method as claimed in claim 88, wherein the flow of the content is expressed by animation.

91. The method as claimed in claim 89, wherein the content flow is changed with change in either or both of the content source and the content destination.

92. The method as claimed in claim 88, wherein a device corresponding to at least one content source and a device corresponding to at least one content destination that receives the content from the content source are displayed on the OSD screen.

93. The method as claimed in claim 92, wherein icon information obtained by OSD-processing functions provided by respective A/V devices is further displayed on the OSD screen.

94. The method as claimed in claim 92, wherein a device corresponding to the content source comprises at least one of a DTT, a DVDP, a VCR, and a HDD, and a device corresponding to the content destination comprises at least one of the DVDR, the VCR, and the HDD.

95. The method as claimed in claim 88, wherein the control unit controls the OSD processing unit to process functions provided by respective devices.

96. An audio/video (A/V) device, comprising:
an OSD processing unit to OSD-process information; and
a control unit to determine whether a content recording medium is loaded into at least one peripheral A/V device connected to the A/V device in communication over a network to perform as a single unit and to control the OSD processing unit to OSD-process a connection diagram indicating at least one of a connection relationship between the A/V device and the at least one connected peripheral A/V device and a connection relationship among the at least one peripheral A/V device upon the determination that the content recording medium is loaded into the at least one connected peripheral A/V device, wherein the control unit controls the OSD processing unit to display an icon on a screen for selecting a desired selection, while also displaying a corresponding icon as it appears on a remote control to facilitate selection of the desired selection with the remote control.

97. The device as claimed in claim 96, wherein the control unit controls the OSD processing unit to indicate content-movable paths at least between the A/V device and the peripheral A/V device or among the peripheral A/V devices as a first connection line.

98. The device as claimed in claim 97, wherein the control unit controls the OSD processing unit to indicate content-moving paths at least between the A/V device and the peripheral A/V device or among the peripheral A/V devices as a second connection line other than the first connection line.

99. The device as claimed in claim 96, wherein the control unit controls the OSD processing unit to eliminate the connection diagram between the one device and the others when the content recording medium is unloaded from the one device.

100. A method of controlling an operation of an audio/video (A/V) device, comprising:
determining whether a content recording medium is loaded into at least one peripheral A/V device that is connected to the A/V device in communication over a network to perform as a single unit;
receiving an OSD screen request signal; and
producing and providing an OSD screen that displays a connection diagram indicating at least one of a connection relationship between the A/V device and the at least one connected peripheral A/V device and a connection relationship among the at least one peripheral A/V device upon the determining that the content recording medium is loaded into the at least one connected peripheral A/V device, wherein
an icon is displayed on the screen for selecting a desired selection, while also displaying a corresponding icon as it appears on a remote control to facilitate selection of the desired selection with the remote control.

101. The method as claimed in claim 100, wherein content-movable paths at least between the A/V device and the peripheral A/V device or among the peripheral A/V devices are displayed on the OSD screen as a first connection line.

102. The method as claimed in claim 101, wherein content-moving paths at least between the A/V device and the peripheral A/V device or among the peripheral A/V devices are displayed on the OSD screen as a second connection line other than the first connection line.

103. The method as claimed in claim 100, wherein the connection diagram between the one device and the others on the OSD screen is eliminated when the content recording medium is unloaded from the one device.

104. An audio/video (A/V) device, comprising:
an OSD processing unit to OSD-process given information; and
a control unit to control the OSD processing unit to OSD-process operational states of the A/V device and at least one connected peripheral A/V device in communication over a network to perform as a single unit, the control unit controlling the OSD processing unit to display a connection diagram indicating a connection relationship among a plurality of icons respectively corresponding to the A/V device and the at least one connected peripheral A/V device, wherein the display of the connection diagram is varied according to the processed operational states of respective devices by emphasizing icons corresponding to the respective devices to allow the user to easily recognize the operational state of each device, wherein
the control unit controls the OSD processing unit to display one of the plurality of icons on a screen for selecting a desired selection, while also displaying a corresponding icon as it appears on a remote control to facilitate selection of the desired selection with the remote control.

105. The device as claimed in claim 104, wherein the A/V device is one of a device corresponding to at least one content source that provides content and a device corresponding to at least one content destination that receives the content from the content source.

106. The device as claimed in claim 104, wherein the peripheral A/V device is one of a device corresponding to at least one content source that provides content and a device corresponding to at least one content destination that receives the content from the content source.

107. The device as claimed in claim 105 or 106, wherein a device corresponding to the content source comprises at least one of a DDT, a DVDP, a VCR, and a HDD, and a device corresponding to the content destination comprises at least one of the DVDR, the VCR, and the HDD.

108. The device as claimed in claim 104, wherein the operational state comprises at least one of content viewing, content recording, content reproducing, and standby.

109. A method of controlling an operation of an audio/video (A/V) device, comprising:
receiving an OSD screen request signal;
producing and providing an OSD screen that displays operational states of the A/V device and at least one connected peripheral A/V device in communication over a network to perform as a single unit; and
displaying a connection diagram indicating a connection relationship among a plurality of icons respectively corresponding to the A/V device and the at least one connected peripheral A/V device, wherein the display of the connection diagram is varied according to the processed operational states of respective devices by emphasizing icons corresponding to the respective devices to allow the user to easily recognize the operational state of each device, wherein
one of the plurality of icons is displayed on the screen for selecting a desired selection, while also displaying a corresponding icon as it appears on a remote control to facilitate selection of the desired selection with the remote control.

110. The method as claimed in claim 109, wherein the A/V device is one of a device corresponding to at least one content source that provides content and a device corresponding to at least one content destination that receives the content from the content source.

111. The method as claimed in claim 109, wherein the peripheral A/V device is one of a device corresponding to at least one content source that provides content and a device corresponding to at least one content destination that receives the content from the content source.

112. The method as claimed in claim 110 or 111, wherein a device corresponding to the content source comprises at least one of a DDT, a DVDP, a VCR, and a HDD, and a device corresponding to the content destination comprises at least one of the DVDR, the VCR, and the HDD.

113. The method as claimed in claim 109, wherein the operational state comprises at least one of content viewing, content recording, content reproducing, and standby.

114. An audio/video (A/V) device, comprising:
an OSD processing unit to OSD-process information; and
a control unit to control the OSD processing unit to OSD-process content flow between the A/V device and at least one connected peripheral A/V device in communication over a network to perform as a single unit, including a first graphical representation indicating a path via which the content actually flows in response to a user's prior selection and a second graphical representation indicating a path via which the content may flow if selected to do so by the user, the first graphical representation and the second graphical representation being displayed in a different format from each other, and change the OSD in response to change in the content flow between the A/V device and the at least one peripheral A/V device, wherein
the control unit controls the OSD processing unit to display an icon on a screen for selecting a desired function, while also displaying a corresponding icon as it appears on a remote control to facilitate selection of the desired function with the remote control.

115. The device as claimed in claim 114, wherein the flow of the content displays content transfer from a content source to a content destination.

116. The device as claimed in claim 115, wherein the content flow is changed with change in either or both of the content source and the content destination.

117. The device as claimed in claim 114, wherein a device corresponding to at least one content source and a device corresponding to at least one content destination that receives the content from the content source are displayed on the OSD screen.

118. The device as claimed in claim 117, wherein a device corresponding to the content source comprises at least one of a DTT, a DVDP, a VCR, and a HDD, and a device corresponding to the content destination comprises at least one of the DVDR, the VCR, and the HDD.

119. The device as claimed in claim 117, wherein the control unit controls the OSD processing unit to OSD-process functions provided by the modules corresponding to the content source and the content destination.

120. A method of controlling an operation of an audio/video (A/V) device, comprising:
receiving an OSD screen request signal; and
producing and providing an OSD screen that displays content flow between the A/V device and at least one connected peripheral A/V device in communication over a network to perform as a single unit being displayed on the OSD screen including a first graphical representation indicating a path via which the content actually flows in response to a user's prior selection and a second graphical representation indicating a path via which the content may flow if selected to do so by the user, the first graphical representation and the second graphical representation being displayed in a different format from each other, and
when the content flow between the A/V device and the at least one peripheral A/V device is changed, changing the OSD screen in response to the change in the content flow, wherein
an icon is displayed on the screen for selecting a desired function, while also displaying a corresponding icon as it appears on a remote control to facilitate selection of the desired function with the remote control.

121. The method as claimed in claim 120, wherein the flow of the content displays content transfer from a content source to a content destination.

122. The method as claimed in claim 121, wherein the content flow is changed with change in either or both of the content source and the content destination.

123. The method as claimed in claim 120, wherein a device corresponding to at least one content source and a device corresponding to at least one content destination that receives the content from the content source are displayed on the OSD screen.

124. The method as claimed in claim 123, wherein a device corresponding to the content source comprises at least one of a DTT, a DVDP, a VCR, and a HDD, and a device corresponding to the content destination comprises at least one of the DVDR, the VCR, and the HDD.

125. The method as claimed in claim 123, wherein functions provided by the devices corresponding to the content source and the content destination are displayed on the OSD screen.

126. A method, comprising:
receiving a display signal request; and
producing a display signal comprising
a first graphical representation indicating a path by which content actually flows between at least two modules of an A/V device in communication over a network to perform as a single unit in response to a user's prior selection of the path, and
a second graphical representation indicating a path by which the content may flow if selected to do so by the user, the first graphical representation and the second graphical representation being displayed using animated graphics different from each other, wherein
an icon is displayed for selecting a desired selection, while also displaying a corresponding icon as it appears on a remote control to facilitate selection of the desired selection with the remote control.

* * * * *